United States Patent
Rangaraju

(10) Patent No.: US 11,317,337 B1
(45) Date of Patent: Apr. 26, 2022

(54) SUBSCRIBER IDENTIFICATION MODULE RANKING AND CONNECTION ROUTING

(71) Applicant: QUALCOMM Incorporated, San Diego, CA (US)

(72) Inventor: Karthik Rangaraju, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/070,121

(22) Filed: Oct. 14, 2020

(51) Int. Cl.
| | |
|---|---|
| *H04W 36/14* | (2009.01) |
| *H04W 4/00* | (2018.01) |
| *H04W 40/02* | (2009.01) |
| *H04W 64/00* | (2009.01) |
| *H04W 8/18* | (2009.01) |
| H04W 88/06 | (2009.01) |

(52) U.S. Cl.
CPC ............. *H04W 40/02* (2013.01); *H04W 8/18* (2013.01); *H04W 64/00* (2013.01); *H04W 88/06* (2013.01)

(58) Field of Classification Search
CPC ....... H04W 76/10; H04W 12/72; H04W 4/60; H04W 4/50; H04W 12/45; H04W 40/02; H04W 8/18; H04W 64/00
See application file for complete search history.

(56) References Cited

U.S. PATENT DOCUMENTS

| | | | |
|---|---|---|---|
| 10,623,943 B1 | 4/2020 | Sevindik et al. | |
| 2013/0329639 A1 | 12/2013 | Wietfeldt et al. | |
| 2015/0092611 A1 | 4/2015 | Ponukumati et al. | |
| 2015/0296520 A1 | 10/2015 | Batchu et al. | |
| 2017/0359762 A1* | 12/2017 | Yoo ........................ | H04W 76/10 |
| 2019/0116488 A1 | 4/2019 | Kumar et al. | |
| 2020/0084814 A1 | 3/2020 | Lindoff et al. | |
| 2021/0219217 A1* | 7/2021 | Hedberg ............... | H04W 48/14 |

OTHER PUBLICATIONS

International Search Report and Written Opinion—PCT/US2021/049224—ISA/EPO—dated Jan. 5, 2022.

* cited by examiner

*Primary Examiner* — Gary Lafontant
(74) *Attorney, Agent, or Firm* — Holland & Hart LLP

(57) ABSTRACT

Methods, systems, and devices for wireless communications are described. A base station may receive an indication for establishing communications between a first user equipment (UE) and a second UE based on a first subscriber identification module (SIM) pair. The base station may compare a first set of capabilities associated with SIMs of the first UE and a second set of capabilities associated with SIMs of the second UE based on the indication. The base station may determine a set of rankings associated with the SIMs of the second UE based on the comparison of the sets of capabilities. The base station may identify a second SIM pair for a connection for establishing the communications between the first UE and the second UE. The base station may establish the connection between the first UE and the second UE based on the second SIM pair.

30 Claims, 16 Drawing Sheets

| ID (MEID, ESN, UDID) | IMEI | SIM Type | Application Profile / SIM Capability | Capability of Current Network | User History / SIM Selection Pattern and Coordinates | Current Coordinates | SIM Ranking |
|---|---|---|---|---|---|---|---|
| SIM 1 | ... | ... | ... | ... | ... | ... | ... |
| SIM 2 | ... | ... | ... | ... | ... | ... | ... |
| SIM X | ... | ... | ... | ... | ... | ... | ... |

FIG. 3

SUBSCRIBER IDENTIFICATION MODULE RANKING AND CONNECTION ROUTING

FIELD OF TECHNOLOGY

The following relates to wireless communications, including subscriber identification module (SIM) ranking and connection routing for enhanced quality of service (QoS) and user experience.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some UEs may be equipped with multiple subscriber identification modules (SIMs) for establishing connections based on different respective radio access technologies (RATs) (e.g., 4G, 5G) or telecommunications operators.

SUMMARY

The described techniques relate to improved methods, systems, devices, and apparatuses that support subscriber identification module (SIM) ranking and connection routing for enhanced quality of service (QoS) and user experience. Generally, the described techniques provide for establishing a connection between a first device and a second device based on an identified SIM pair.

A method of wireless communication is described. The method may include receiving an indication for establishing communications between a first device and a second device based on a first SIM pair, the first SIM pair including a first SIM from a first set of SIMs of the first device and a second SIM of a second set of SIMs of the second device, comparing a first set of capabilities associated with the first set of SIMs and a second set of capabilities associated with the second set of SIMs based on the indication for establishing the communications between the first device and the second device, identifying a second SIM pair between a first candidate SIM from the first set of SIMs and a second candidate SIM from the second set of SIMs for a connection for establishing the communications between the first device and the second device based on the comparing the first set of capabilities with the second set of capabilities, and establishing the connection between the first device and the second device based on the second SIM pair.

An apparatus for wireless communication is described. The apparatus may include a processor, memory coupled with the processor, and instructions stored in the memory. The instructions may be executable by the processor to cause the apparatus to receive an indication for establishing communications between a first device and a second device based on a first SIM pair, the first SIM pair including a first SIM from a first set of SIMs of the first device and a second SIM of a second set of SIMs of the second device, compare a first set of capabilities associated with the first set of SIMs and a second set of capabilities associated with the second set of SIMs based on the indication for establishing the communications between the first device and the second device, identify a second SIM pair between a first candidate SIM from the first set of SIMs and a second candidate SIM from the second set of SIMs for a connection for establishing the communications between the first device and the second device based on the comparing the first set of capabilities with the second set of capabilities, and establish the connection between the first device and the second device based on the second SIM pair.

Another apparatus for wireless communication is described. The apparatus may include means for receiving an indication for establishing communications between a first device and a second device based on a first SIM pair, the first SIM pair including a first SIM from a first set of SIMs of the first device and a second SIM of a second set of SIMs of the second device, comparing a first set of capabilities associated with the first set of SIMs and a second set of capabilities associated with the second set of SIMs based on the indication for establishing the communications between the first device and the second device, identifying a second SIM pair between a first candidate SIM from the first set of SIMs and a second candidate SIM from the second set of SIMs for a connection for establishing the communications between the first device and the second device based on the comparing the first set of capabilities with the second set of capabilities, and establishing the connection between the first device and the second device based on the second SIM pair.

A non-transitory computer-readable medium storing code for wireless communication is described. The code may include instructions executable by a processor to receive an indication for establishing communications between a first device and a second device based on a first SIM pair, the first SIM pair including a first SIM from a first set of SIMs of the first device and a second SIM of a second set of SIMs of the second device, compare a first set of capabilities associated with the first set of SIMs and a second set of capabilities associated with the second set of SIMs based on the indication for establishing the communications between the first device and the second device, identify a second SIM pair between a first candidate SIM from the first set of SIMs and a second candidate SIM from the second set of SIMs for a connection for establishing the communications between the first device and the second device based on the comparing the first set of capabilities with the second set of capabilities, and establish the connection between the first device and the second device based on the second SIM pair.

Some examples of the method, apparatuses, and non-transitory computer-readable medium described herein may further include operations, features, means, or instructions for determining a set of rankings associated with the second set of SIMs based on the first set of capabilities associated with the first set of SIMs and the second set of capabilities associated with the second set of SIMs, where identifying the second SIM pair includes identifying the second candidate SIM from the second set of SIMs based on determining the set of rankings associated with the second set of SIMs.

Some examples of the method, apparatuses, and non-transitory computer-readable medium described herein may further include operations, features, means, or instructions for determining the set of rankings associated with the second set of SIMS may be based on a lookup table (LUT) including at least the set of rankings associated with the second set of SIMS.

In some examples of the method, apparatuses, and non-transitory computer-readable medium described herein, the LUT may include operations, features, means, or instructions for an identifier of the SIM, a set of radio access technologies (RATs) supported by the SIM, a QoS associated with the SIM with respect to each application of a set of applications, a set of whitelisted applications of the set of applications, the set of whitelisted applications being associated with a set of user preferences, a user selection, or both, a set of network capabilities associated with the SIM with respect to one or more sets of coordinates, a profile associated with establishing one or more previous connections using the SIM with respect to the one or more sets of coordinates, and a current set of coordinates of a device including the SIM.

In some examples of the method, apparatuses, and non-transitory computer-readable medium described herein, the indication for establishing the communications includes a QoS associated with one or more of an application on the first device or a user profile, where comparing the first set of capabilities associated with the first set of SIMs and the second set of capabilities associated with the second set of SIMs may be based on the QoS.

In some examples of the method, apparatuses, and non-transitory computer-readable medium described herein, the indication for establishing the communications includes a RAT associated with an application of the first device, where comparing the first set of capabilities associated with the first set of SIMs and the second set of capabilities associated with the second set of SIMs may be based on the RAT associated with the application.

In some examples of the method, apparatuses, and non-transitory computer-readable medium described herein, the first SIM may be associated with a first RAT, the second SIM may be associated with a second RAT different from the first RAT, the first candidate SIM includes the first SIM, and the second candidate SIM includes a SIM that may be different from the second SIM and associated with the first RAT.

In some examples of the method, apparatuses, and non-transitory computer-readable medium described herein, the first SIM may be associated with a first RAT, the second SIM may be associated with the first RAT, where a first set of network capabilities associated with the second SIM with respect to a first set of coordinates fail to satisfy a threshold, and a second set of network capabilities associated with the second SIM with respect to a second set of coordinates satisfy the threshold, the first candidate SIM includes the first SIM, and the second candidate SIM includes a SIM that may be different from the second SIM and associated with the first RAT, where a set of network capabilities associated with the second candidate SIM with respect to the first set of coordinates satisfy the threshold.

In some examples of the method, apparatuses, and non-transitory computer-readable medium described herein, the first SIM may be associated with a first RAT, where a set of network capabilities of the first SIM includes a first set of network capabilities supporting the first RAT and a second set of network capabilities supporting a second RAT different from the first RAT, the second SIM may be associated with the second RAT, the first candidate SIM includes the first SIM, where the first SIM may be configured for using the second set of network capabilities supporting the second RAT, and the second candidate SIM includes the second SIM.

In some examples of the method, apparatuses, and non-transitory computer-readable medium described herein, the second device may be located at a first set of coordinates, the first SIM may be associated with a first RAT, the second SIM may be associated with the first RAT, where a profile associated with the second SIM includes an indication of establishing one or more previous connections using the first RAT at a second set of coordinates, the first candidate SIM includes the first SIM, and the second candidate SIM includes a SIM that may be different from the second SIM and associated with the first RAT, where a profile associated with the second candidate SIM includes an indication of establishing one or more previous connections using the first RAT at the first set of coordinates.

In some examples of the method, apparatuses, and non-transitory computer-readable medium described herein, the second SIM pair includes one or more of the first SIM or the second SIM of the first SIM pair.

A method of wireless communication at a first device is described. The method may include transmitting, to a base station, an indication for establishing communications between a first device and a second device based on a first SIM pair, the first SIM pair including a first SIM from a set of SIMs of the first device and a second SIM of a second set of SIMs of the second device and establishing a connection for the communications between the first device and the second device based on a second SIM pair including a first candidate SIM from the first set of SIMs and a second candidate SIM from the second set of SIMs, where the second SIM pair is based on a first set of capabilities associated with the first set of SIMs and a second set of capabilities associated with the second set of SIMs.

An apparatus for wireless communication at a first device is described. The apparatus may include a processor, memory coupled with the processor, and instructions stored in the memory. The instructions may be executable by the processor to cause the apparatus to transmit, to a base station, an indication for establishing communications between a first device and a second device based on a first SIM pair, the first SIM pair including a first SIM from a set of SIMs of the first device and a second SIM of a second set of SIMs of the second device and establish a connection for the communications between the first device and the second device based on a second SIM pair including a first candidate SIM from the first set of SIMs and a second candidate SIM from the second set of SIMs, where the second SIM pair is based on a first set of capabilities associated with the first set of SIMs and a second set of capabilities associated with the second set of SIMs.

Another apparatus for wireless communication at a first device is described. The apparatus may include means for transmitting, to a base station, an indication for establishing communications between a first device and a second device based on a first SIM pair, the first SIM pair including a first SIM from a set of SIMs of the first device and a second SIM of a second set of SIMs of the second device and establishing a connection for the communications between the first device and the second device based on a second SIM pair including a first candidate SIM from the first set of SIMs and a second candidate SIM from the second set of SIMs, where the second SIM pair is based on a first set of capabilities associated with the first set of SIMs and a second set of capabilities associated with the second set of SIMs.

A non-transitory computer-readable medium storing code for wireless communication at a first device is described. The code may include instructions executable by a processor to transmit, to a base station, an indication for establishing communications between a first device and a second device based on a first SIM pair, the first SIM pair including a first SIM from a set of SIMs of the first device and a second SIM of a second set of SIMs of the second device and establish a connection for the communications between the first device and the second device based on a second SIM pair including a first candidate SIM from the first set of SIMs and a second candidate SIM from the second set of SIMs, where the second SIM pair is based on a first set of capabilities associated with the first set of SIMs and a second set of capabilities associated with the second set of SIMs.

Some examples of the method, apparatuses, and non-transitory computer-readable medium described herein may further include operations, features, means, or instructions for receiving, from the base station, a request to establish the connection based on the second SIM pair, the request including an indication of a set of capabilities associated with one or more of the first SIM, the second SIM, the first candidate SIM, or the second candidate SIM, and transmitting, to the base station, a response accepting the request, where establishing the connection based on the second SIM pair may be based on transmitting the response.

In some examples of the method, apparatuses, and non-transitory computer-readable medium described herein, the first SIM may be associated with a first RAT, the second SIM may be associated with a second RAT different from the first RAT, the first candidate SIM includes the first SIM, and the second candidate SIM includes a SIM that may be different from the second SIM and associated with the first RAT.

In some examples of the method, apparatuses, and non-transitory computer-readable medium described herein, the first SIM may be associated with a first RAT, the second SIM may be associated with the first RAT, where a first set of network capabilities associated with the second SIM with respect to a first set of coordinates fail to satisfy a threshold, and a second set of network capabilities associated with the second SIM with respect to a second set of coordinates satisfy the threshold, the first candidate SIM includes the first SIM, and the second candidate SIM includes a SIM that may be different from the second SIM and associated with the first RAT, where a set of network capabilities associated with the second candidate SIM with respect to the first set of coordinates satisfy the threshold.

In some examples of the method, apparatuses, and non-transitory computer-readable medium described herein, the first SIM may be associated with a first RAT, where a set of network capabilities of the first SIM includes a first set of network capabilities supporting the first RAT and a second set of network capabilities supporting a second RAT different from the first RAT, the second SIM may be associated with the second RAT, the first candidate SIM includes the first SIM, where the first SIM may be configured for using the second set of network capabilities supporting the second RAT, and the second candidate SIM includes the second SIM.

In some examples of the method, apparatuses, and non-transitory computer-readable medium described herein, the second device may be located at a first set of coordinates, the first SIM may be associated with a first RAT, the second SIM may be associated with the first RAT, where a profile associated with the second SIM includes an indication of establishing one or more previous connections using the first RAT at a second set of coordinates, the first candidate SIM includes the first SIM, and the second candidate SIM includes a SIM that may be different from the second SIM and associated with the first RAT, where a profile associated with the second candidate SIM includes an indication of establishing one or more previous connections using the first RAT at the first set of coordinates.

BRIEF DESCRIPTION OF THE DRAWINGS

FIG. 3 illustrates an example of a lookup table (LUT) that supports SIM ranking and connection routing in accordance with aspects of the present disclosure.

DETAILED DESCRIPTION

Figure 1:
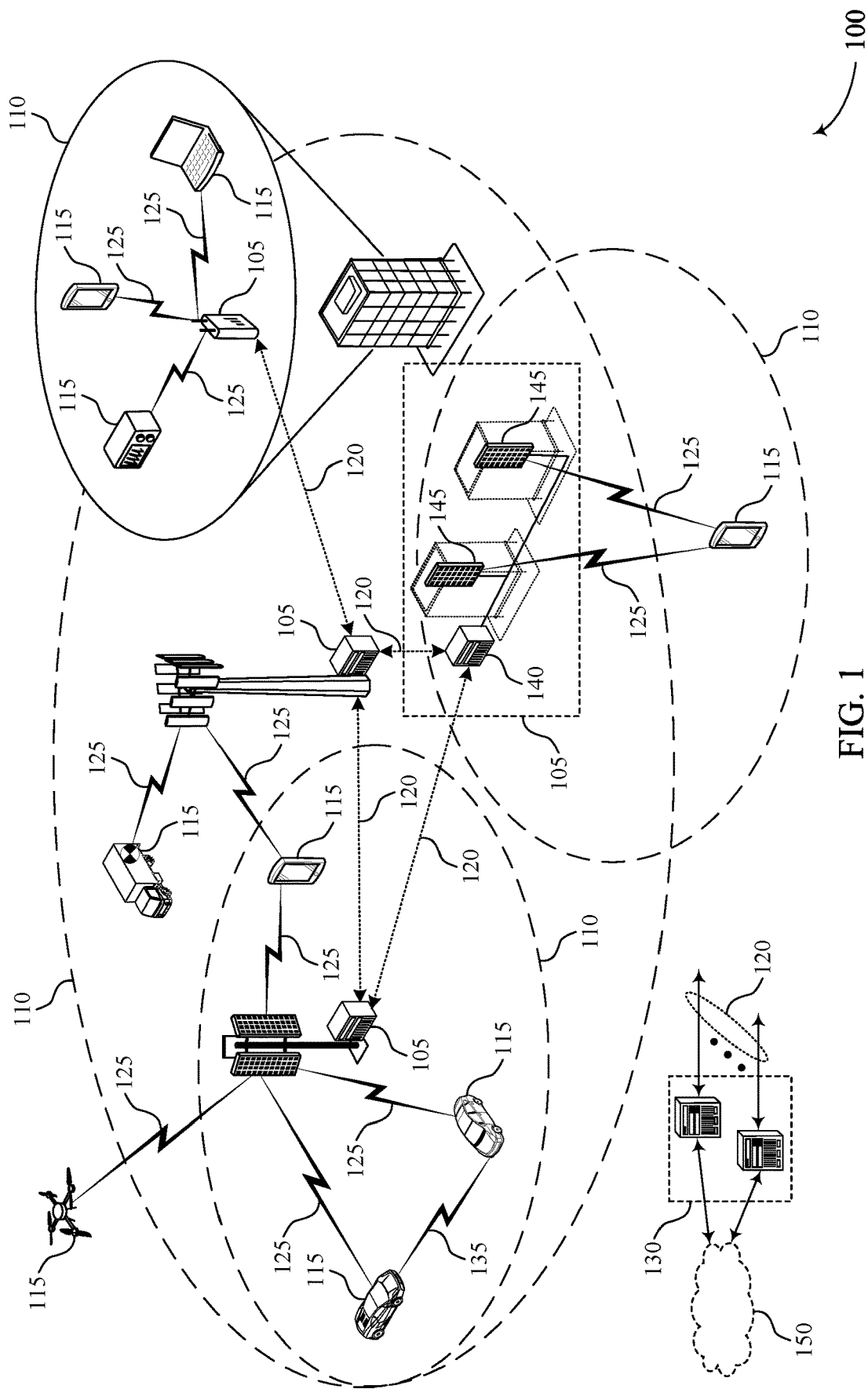
FIG. 1 illustrates an example of a system for wireless communications that supports subscriber identification module (SIM) ranking and connection routing in accordance with aspects of the present disclosure.

A wireless communications system may support communication across different devices using a combination of different radio access technologies (RATs). Accordingly, some user equipment (UEs) may be equipped with multiple subscriber identification modules (SIMs) for establishing connections based on different respective RATs (e.g., fourth generation (4G), fifth generation (5G)), telecommunications operators, or subscriptions. In some cases, when a UE equipped with dual SIMs initiates communications with another UE also equipped with dual SIMs, the UE initiating the communications may be unaware of SIM capabilities at the other UE. For example, the initiating UE may be unaware of SIM capabilities such as supported quality of service (QoS), supported RATs, or SIM/network behavior (e.g., with respect to sets of geographic coordinates) at the other UE.

Accordingly, some networks may blindly establish a connection for communications between the UEs, without consideration of the capabilities of the SIMs equipped at each UE. In some cases, such blind connection establishment may result in a reduced QoS and degraded user experience. For example, the UE and the other UE may both be equipped with a SIM having capabilities for a first RAT (e.g., a 5G capable SIM) and a SIM having capabilities for a second RAT (e.g., a 4G capable SIM).

However, the UE may be unaware of SIM capabilities when initiating a communication to the other UE, and accordingly, may be unable to determine a SIM pairing tailored to a QoS of a communication application (e.g., a video call application, extended reality (XR) video calling, etc.) at the UEs. In some cases, the UE may be unable to determine a SIM pairing which effectively utilizes available network capabilities of a wireless communications system. In some cases, the UE may be unaware of mismatches between SIM capabilities at the UE and the other UE when initiating a communication. For example, the UE may initiate communication from a SIM of the UE having capabilities for the first RAT (e.g., a 5G capable SIM) to a SIM of the other UE having capabilities for the second RAT (e.g., a 4G capable SIM), even when the other UE is equipped with a SIM having capabilities for the first RAT (e.g., a 5G capable SIM). In some cases, a network may blindly establish or route a communication (e.g., video call, audio call, XR video call) originating from the 5G capable SIM of the UE to the 4G capable SIM of the other UE. Accordingly, such blind establishment or routing of the communication may result in a loss of 5G (e.g., NR or future new generation network) features or advantages at the other UE, among other potential issues.

Various techniques are described for routing communications between SIMs of a UE and SIMs of another UE based on rankings of the SIMS. In some aspects, the described techniques for routing the communications may be implemented regardless of the SIM used for initiating the communications and the SIM originally intended as the recipient for receiving the communications.

A base station may receive an indication for establishing communications (e.g., a voice call, a data connection, etc.) between a first UE and a second UE based on a first "SIM pair." In an example, the first SIM pair may include a first SIM from the first UE (e.g., the SIM used for originating the call or connection) and a second SIM of the second UE (e.g., originally intended recipient SIM at the second UE). The indication may include a QoS associated with an application on the first UE. In some cases, the QoS may be associated with a user profile on the first UE. In some other examples, the indication may include a RAT (e.g., 4G, 5G) associated with the application.

The base station may compare a first set of capabilities associated with SIMs of the first UE and a second set of capabilities associated with SIMs of the second UE based on the indication. In some aspects, the base station may determine a set of rankings associated with the SIMs of the second UE based on the comparison of the sets of capabilities. In some cases, the base station may determine the set of rankings based on a lookup table (LUT) including rankings for both the SIMs of the first UE and the SIMs of the second UE. The base station may identify a second "SIM pair" for a connection for establishing the communications between the first UE and the second UE. In an example, the base station may identify the second SIM pair by changing either the original SIM of the first UE (e.g., selecting another SIM of the first UE) or the original SIM of the second UE (e.g., selecting another SIM of the second UE). The base station may establish the connection between the first UE and the second UE based on the second SIM pair.

The first UE may initiate a call (or connection) using a first SIM pair. For example, the first UE may transmit an indication for establishing communications (e.g., a call, a connection) between the first UE and a second UE based on the first SIM pair. The first UE may establish the call with a second SIM pair with assistance from the base station. For example, the UE may receive, from the base station, a request to establish the connection based on the second SIM pair. The request may include an indication of a set of capabilities associated with SIMs of the first SIM pair. For example, the request may include an indication of a set of capabilities associated with a first SIM from the first UE (e.g., the SIM used for originating the call or connection) and a second SIM of the second UE (e.g., originally intended recipient SIM at the second UE). The request may include an indication of a set of capabilities associated with candidate SIMs of the first UE and the second UE for establishing communications.

The first UE may transmit a response accepting the request. In some examples, the first UE may establish the connection based on the second SIM pair based on transmitting the response. In some cases, the first UE may display or output a prompt requesting a user input to confirm changing between SIMs (e.g., to increase call quality), and the first UE may reroute the connection based on a user input confirming the connection. In some other examples, the rerouting may be automatic. In some cases, the second UE may be unaware of first SIM pair initially intended by the first UE. For example, the second UE may receive a signal from the base station to connect after the rerouting (e.g., the identification of the second SIM pair by the base station, the first UE confirming the connection) has already occurred.

Aspects of the subject matter described herein may be implemented to realize one or more advantages. The described techniques may support improvements in spectral efficiency and reliability, among other advantages. In some aspects, establishing communications between the first UE and the second UE based on capabilities of SIMs of the UEs may provide an improved user experience through proactive and upfront selection of SIMs which may effectively support QoS of a communication application (e.g., a video call application) at the UEs, RAT specific features, or other technologies.

Aspects of the disclosure are initially described in the context of a wireless communications system. Examples of processes and signaling exchanges that support proactive and intelligent SIM ranking based connection routing for enhanced QoS and user experience are then described. Aspects of the disclosure are further illustrated by and described with reference to apparatus diagrams, system diagrams, and flowcharts that relate to SIM ranking based connection routing for enhanced QoS and user experience.

FIG. 1 illustrates an example of a wireless communications system 100 that supports uplink sensing with multiple beams in a shared spectrum in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some UEs 115 may be equipped with multiple SIMs for establishing connections based on different respective RATs (e.g., 4G, 5G), telecommunications operators, or subscriptions. For example, a UE 115 may support dual SIM dual active (DSDA) technologies for communicating over wireless communications system 100. Such support of DSDA technologies may support communication between relatively newer devices (e.g., a UE 115 equipped with both a 5G capable SIM and a 4G capable SIM) and older devices (e.g., a UE 115 equipped with a 4G capable SIM). However, in some cases, when a UE 115 equipped with dual SIMs initiates communications with another UE 115 also equipped with dual SIMs, the UE 115 initiating the communications may be unaware of SIM capabilities at the other UE 115. For example, the UE 115 may be unaware of SIM capabilities such as supported QoS, supported RATs, network capability or features, or SIM/network behavior (e.g., with respect to sets of coordinates) at the other UE 115.

Accordingly, some networks (e.g., a base station 105) may blindly establish a connection for communications between the UE 115s, without consideration of the capabilities of the SIMs equipped at each UE 115. In some cases, such blind connection establishment may result in a reduced QoS and degraded user experience. For example, the UE 115 and the other UE 115 may both be equipped with a SIM having capabilities for a first RAT (e.g., a 5G capable SIM) and a SIM having capabilities for a second RAT (e.g., a 4G capable SIM). In some cases, a network (e.g., a base station 105) may blindly establish or route a communication (e.g., video call, audio call, XR video call) originating from the 5G capable SIM of the UE 115 to the 4G capable SIM of the other UE 115. Accordingly, such blind establishment or routing of the communication may result in a loss of 5G or NR features/advantages at the other UE 115.

A base station 105 may receive an indication for establishing communications (e.g., a call, a connection) between a first UE 115 and a second UE 115 based on a first SIM pair. In an example, the first SIM pair may include a first SIM from the first UE 115 (e.g., the SIM used for originating the call or connection) and a second SIM of the second UE 115 (e.g., originally intended recipient SIM at the second UE 115). The indication may include a QoS associated with an application on the first UE 115. In some cases, the QoS may be associated with a user profile or application profile on the first UE 115. In some other examples, the indication may include a RAT (e.g., 4G, 5G, NR) associated with the application on the first UE 115.

The base station 105 may compare a first set of capabilities associated with SIMs of the first UE 115 and a second set of capabilities associated with SIMs of the second UE 115 based on the indication. In some aspects, the base station 105 may determine a set of rankings associated with the SIMs of the second UE 115 based on the comparison of the sets of capabilities. In some cases, the base station 105 may determine the set of rankings based on a lookup table (LUT) including rankings for both the SIMs of the first UE 115 and the SIMs of the second UE 115. The base station 105 may identify a second SIM pair for a connection for establishing the communications between the first UE 115 and the second UE 115. In an example, the base station 105 may identify the second SIM pair by changing the original SIM of the first UE 115 (e.g., selecting another SIM of the first UE 115) or by changing the original SIM of the second UE 115 (e.g., selecting another SIM of the second UE 115). The base station 105 may establish the connection between the first UE 115 and the second UE 115 based on the second SIM pair.

The first UE 115 may initiate a call (or connection) using a first SIM pair. For example, the first UE 115 may transmit an indication for establishing communications (e.g., a call, a connection) between the first UE 115 and a second UE 115 based on the first SIM pair. The first UE 115 may establish the call with a second SIM pair with assistance from the base station 105. For example, the first UE 115 may receive, from the base station 105, a request to establish the connection based on the second SIM pair. The request may include an indication of a set of capabilities associated with SIMs of the first SIM pair, for example, a first SIM from the first UE 115 (e.g., the SIM used for originating the call or connection) and a second SIM of the second UE 115 (e.g., originally intended recipient SIM at the second UE 115). The request may include an indication of a set of capabilities associated with candidate SIMs of the first UE 115 and the second UE 115 (e.g., dual SIMs established at both the first UE 115 and the second UE 115) for establishing communications.

The first UE 115 may transmit a response accepting the request. In some examples, the first UE 115 may establish the connection based on the second SIM pair based on transmitting the response. In some cases, the first UE 115 may display or output a prompt requesting a user input to confirm changing between SIMs (e.g., to increase call quality), and the first UE 115 may reroute the connection based on a user input confirming the connection. In some other examples, the rerouting may be automatic. In some cases, the second UE 115, may be unaware of first SIM pair initially intended by the first UE 115. For example, the second UE 115 may receive a signal from the base station 105 to connect after the rerouting (e.g., the identification of the second SIM pair by the base station 105, the first UE 115 confirming the connection) has already occurred.

Figure 2:
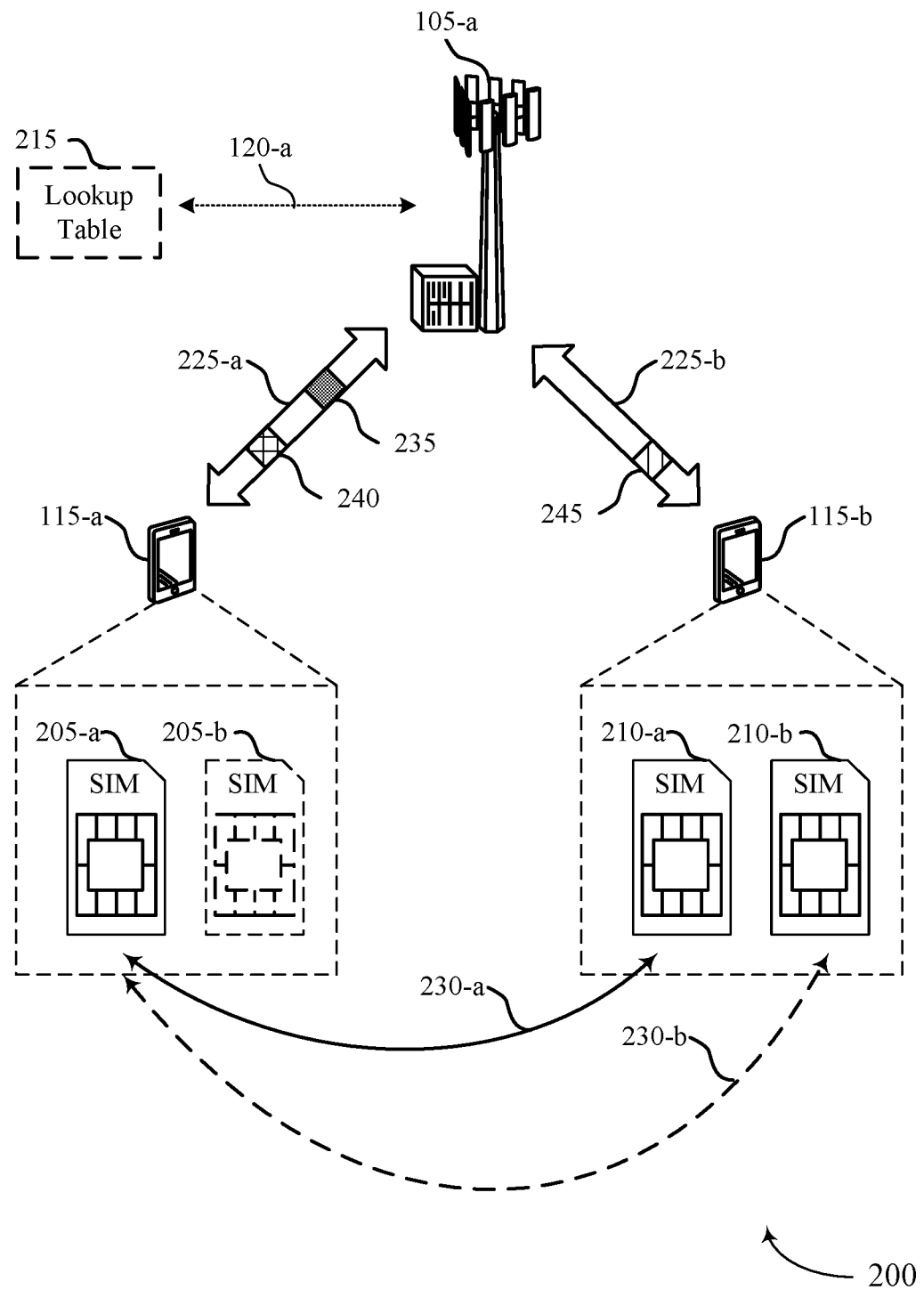
FIG. 2 illustrates an example of a wireless communications system that supports SIM ranking and connection routing in accordance with aspects of the present disclosure.

FIG. 2 illustrates an example of a wireless communications system 200 that supports SIM ranking and connection routing in accordance with aspects of the present disclosure. In some examples, wireless communications system 200 may implement aspects of wireless communication system 100 and may include UE 115-*a* and UE 115-*b*, which may be examples of a UE 115 described with reference to FIG. 1. Wireless communications system 200 may include base station 105-*a*, which may be an example of a base station 105 described with reference to FIG. 1.

UE 115-*a*, UE 115-*b*, and base stations 105-*a* may wirelessly communicate with one another via communication links 225 (e.g., communication link 225-*a* and communication link 225-*b*) over one or more carriers. For example, UE 115-*a* may wirelessly communicate with base station 105-*a* via communication link 225-*a*, and UE 115-*b* may wirelessly communicate with base station 105-*a* via communication link 225-*b*.

UE 115-*a* and UE 115-*b* may each include multiple SIMs for establishing connections based on different respective RATs (e.g., 4G, 5G), telecommunications operators, or subscriptions. For example, referring to FIG. 2, UE 115-*a* may include SIM 205-*a* and SIM 205-*b*, and UE 115-*b* may include SIM 210-*a* and SIM 210-*b*. In some cases, UE 115-*a* may include a single SIM (e.g., SIM 205-*a*), and UE 115-*b* may include multiple SIMs (e.g., SIM 210-*a* and SIM 210-*b*).

According to examples of aspects described herein, base station 105-*a* may receive an indication 235 for establishing communications (e.g., a call, a connection) between UE 115-*a* and UE 115-*b* based on a first SIM pair (e.g., SIM pair 230-*a*). Base station 105-*a* may receive the indication 235, for example, via communications link 225-*a*. In an example, the SIM pair 230-*a* may include SIM 205-*a* from UE 115-*a* (e.g., where SIM 205-*a* is used by UE 115-*a* for originating the call or connection) and SIM 210-*a* of UE 115-*b* (e.g., where SIM 210-*a* is an originally intended recipient SIM at UE 115-*b*). The indication 235 may include a QoS associated with an application on UE 115-*a*. In some cases, the QoS may be associated with a user profile or application profile on UE 115-*a*. In some other examples, the indication 235 may include a RAT (e.g., 4G, 5G, NR) associated with the application on UE 115-*a*.

Base station 105-*a* may compare a first set of capabilities associated with SIMs 205 of UE 115-*a* and a second set of capabilities associated with SIMs 210 of UE 115-*b* based on the indication 235. In some aspects, base station 105-*a* may determine a set of rankings associated with the SIMs 210 of UE 115-*b* based on the comparison of the sets of capabilities. In some cases, base station 105-*a* may determine the set of rankings based on a lookup table (LUT) 215 including rankings for both the SIMs 205 of UE 115-*a* and the SIMs 210 of UE 115-*b*. In some examples, the LUT 215 may be stored on a memory electrically coupled to the base station 105-*a*. In some other examples, the LUT 215 may be stored on a remote database, which the base station 105-*a* may access via a backhaul link 120-*a*.

Base station 105-*a* may identify a second SIM pair (e.g., SIM pair 230-*b*) for a connection for establishing the communications between UE 115-*a* and UE 115-*b*. In an example, base station 105-*a* may identify the SIM pair 230-*b* by selecting another SIM 205 (e.g., selecting SIM 205-*b*) of UE 115-*a* or by selecting another SIM 210 (e.g., SIM 210-*b*) of UE 115-*b*. Base station 105-*a* may establish the connection between UE 115-*a* and UE 115-*b* based on the SIM pair 230-*b*.

In an example perspective from UE 115-*a*, UE 115-*a* may initiate a call (or connection) using SIM pair 230-*a*. For example, UE 115-*a* may transmit the indication 235 for establishing communications (e.g., a call, a connection) between UE 115-*a* and a second UE 115 (e.g., UE 115-*b*) based on the SIM pair 230-*a*. UE 115-*a* may transmit the indication 235 via communications link 225-*a*. UE 115-*a* may establish the call with SIM pair 230-*b* with assistance from the base station 105-*a*.

SIM pair 230-*b* may include SIM 205-*a* and SIM 210-*b*. In some cases, SIM pair 230-*b* may include SIM 205-*b* and SIM 210-*b*. In some other cases, SIM pair 230-*b* may include SIM 205-*b* and SIM 210-*a*. SIM pair 230-*b* may be based on a first set of capabilities associated with SIMs 205 and a second set of capabilities associated with SIMs 210.

UE 115-*a* may receive, from base station 105-*a*, a request 240 to establish the connection based on the SIM pair 230-*b*. The request 240 may include an indication of a set of capabilities associated with SIM 205-*a* (e.g., the SIM used by UE 115-*a* for originating the call or connection) and SIM 210-*a* (e.g., originally intended recipient SIM at UE 115-*b*) of the SIM pair 230-*a*. The request 240 may include an indication of a set of capabilities associated with candidate SIMs of UE 115-*a* and UE 115-*b* (e.g., dual SIMs established at both UE 115-*a* and UE 115-*b*) for establishing communications.

UE 115-*a* may transmit a response accepting the request 240, and UE 115-*a* may establish the connection based on the SIM pair 230-*b* based on transmitting the response. In some cases, UE 115-*a* may display or output a prompt requesting a user input to confirm changing between SIMs (e.g., to increase call quality). In an example, UE 115-*a* or base station 105-*a* may reroute the connection based on a user input confirming the connection. In some aspects, the prompt may include the request 240, without revealing any private information related to the SIMs 210 at UE 115-*b*.

In some other examples, the rerouting by base station 105-*a* may be automatic. In some cases, UE 115-*b* may be unaware of the SIM pair 230-*a* initially intended by UE 115-*a*. For example, UE 115-*b* may receive a signal 245 from the base station 105-*a* to establish a connection, after the rerouting has already occurred. In an example, UE 115-*b* may receive the signal 245 from base station 105-*a* after the identification of the SIM pair 230-*b* by base station 105, or after the confirmation by UE 115-*a*. In some aspects, the described techniques for routing the communications may be implemented regardless of the SIM 205 (e.g., SIM 205-*a*) used for initiating the communications and the SIM 210

(e.g., SIM 210-*a*) originally intended as the recipient for receiving the communications.

The LUT 215 may include identification information associated with UEs 115 (e.g., UE 115-*a* and UE 115-*b*). For example, for each of UE 115-*a* and UE 115-*b*, the LUT 215 may include any combination of a mobile equipment identifier (MEID), a unique identifier (UdiD), one or more international mobile equipment identities (IMEIs), an electronic serial number (ESN), and international mobile station equipment identity software version (IMEISV). In some cases, the LUT 215 may group Ues 115 (e.g., UE 115-*a* and UE 115-*b*) and SIMs equipped in the Ues 115 according to a key, such as, according to any combination of MEID, EIR, UDID, or IMEI. In some examples, in the LUT 215, the MEID and the equipment identity register (EIR) may be the same for a UE 115 equipped with dual SIMs. For example, in the LUT 215, the MEID and the EIR may be the same for SIM 205-*a* and SIM 205-*b* of UE 115-*a*, and remaining identification information (e.g., ICCID and key) may be different.

The LUT 215 may include identification information associated with SIMs 205 equipped in UE 115-*a* and SIMs 210 equipped in UE 115-*b*. For example, for each of SIMs 205 and SIMs 210, the LUT 215 may include an integrated circuit card identifier (ICCID). In some cases, the LUT 215 may include a set of RATs (e.g., 4G, 5G) supported by each SIM (e.g., the LUT 215 may indicate SIM type for each SIM). In some examples, the LUT 215 may include a QoS associated with each SIM with respect to applications on a UE 115 (e.g., UE 115-*a*) equipped with the SIM.

In some aspects, the LUT 215 may include a set of whitelisted applications for each UE 115 (e.g., UE 115-*a*, UE 115-*b*). The set of whitelisted applications may be associated with a set of user preferences. In some other aspects, the set of whitelisted applications may be associated with a user selection. For example, the set of whitelisted applications may be associated with a user history associated with using an application in combination with a SIM. In some examples, the user selection may be a previous or current user input selecting a SIM for an application (e.g., based on a prompt displayed by a UE 115).

In some examples, the LUT 215 may include a set of network capabilities (e.g., RAT capabilities) associated with each SIM with respect to one or more sets of coordinates. In some other examples, the LUT 215 may include a profile associated with establishing one or more previous connections using the SIM with respect to the one or more sets of coordinates. For example, the profile may be a user profile including a history of established connections in association with a user, the SIM, and different sets of coordinates. In some aspects, the LUT 215 may include a current set of coordinates of a UE 115 equipped with the SIM (e.g., current coordinates of UE 115-*a* equipped with SIM 205-*a*). Example aspects of the LUT 215 are described with reference to FIG. 3.

The example techniques described herein may be driven based on a subscription or QoS aware network for a given UE 115 based on the LUT 300 maintained using MEID (e.g., universal unique ID). In some aspects, two separate mobile station international subscriber Directory Numbers (MSISDNs), two different IMEIs, two different SIMs, etc. may be tagged to a UE 115 based on MEID as lookup information or available information for all networks. In some aspects, the information may be available to all networks and base stations 115. In some cases, MEID may be incorporated as a common unique identifier for multiple SIMs in a UE 115.

In some examples, the techniques described herein may include the use of any combination of the capability of a network subscription (e.g., not a capability of a SIM card), historical data, QoS, application demand (e.g., QoS demand), user profile, or application profile, RAT type, and network capability, to determine how to route incoming calls to a SIM 210 (e.g., SIM 210-*a*, SIM 210-*b*) at a UE 115 (e.g., at UE 115-*b*). The described techniques may provide increased spectral efficiency compared to some techniques of routing incoming calls based on a SIM number (e.g., SIM identifier associated with a phone number).

The examples described herein may include network overlay operations. For example, the examples may include operations for automatic handover at a network associated with an initial intended receiving UE 115 (e.g., based on a user preference enabling automatic handover) from a data pipe associated with a first RAT (e.g., 4G) to a data pipe associated with a second RAT (e.g., 5G) for "a duration within a call duration." In some cases, the network to which a SIM of a UE 115 is connected may determine whether to switch data pipes.

In some aspects, the examples may include conditional call forwarding from a SIM (e.g., SIM 210-*a*) connected to a first telecommunications operator A to a SIM (e.g., SIM 210-*b*) connected to a second telecommunications operator B based on the QoS or network subscription for an incoming data pipe. In some cases, the telecommunications operator associated with a called party (e.g., UE 115-*b*) or an initially designated SIM 210 of the called party (e.g., SIM 210-*a* of UE 115-*b*) may determine whether to forward a call to another SIM 210 (e.g., SIM 210-*b*) to support a QoS associated with a user profile, a user preference, or an application associated with the calling party (e.g., UE 115-*a*) or the called party (e.g., UE 115-*b*).

In some cases, a UE 115 (e.g., UE 115-*a*, UE 115-*b*) may output a prompt or indication requesting consent from a user for a temporary change of subscription (e.g., from a first RAT to a second RAT) to handle a current call. The prompt or indication may be configured based on criteria such as user profile information, a user contact list, application type, etc. Such examples of a prompt or indication may provide for meeting user preferences (e.g., QoS), with relatively minimal delay associated with latching or paging from the first RAT (e.g., 4G) to the second RAT (e.g., 5G).

In an example case, UE 115-*a* may initiate a call to UE 115-*b* according to a phone number associated with a SIM 210 (e.g., SIM 210-*a*) equipped at UE 115-*b*. UE 115-*a* may extract (e.g., using a SIM decoder component included in UE 115-*a*) an MEID associated with UE 115-*b* based on the phone number. In some cases, UE 115-*a* may update the LUT 215 with the extracted MEID. In some aspects, UE 115-*a* may update the LUT 215 with extracted MEIDs based on regular (e.g., scheduled, periodic) synchronizations with the network (e.g., wireless communications system 200, base station 105-*a*).

According to examples of aspects described herein, base station 105-*a* may proactively and intelligently establish a connection between UE 115-*a* and UE 115-*b*, for example, for routing any type of call initiated at one of the UEs 115 (e.g., initiated at UE 115-*a*) and designated for another UE 115 (e.g., UE 115-*b*). For example, base station 105-*a* may route a call associated with specified bandwidth criteria, latency criteria, or technology related features using a set of SIMs determined by base station 105-*a* for the call. In an example, base station 105-*a* may route the call from a SIM 205 (e.g., SIM 205-*a*, SIM 205-*b*) of UE 115-*a* to a SIM 210 (e.g., SIM 210-*a*, SIM 210-*b*) of UE 115-*b* based on capabilities and rankings of SIM 205 and SIM 210, which base station 105-a may determine or identify using the LUT 215. In some aspects, base station 105-a may select each of SIM 205 (e.g., SIM 205-a, SIM 205-b) and SIM 210 (e.g., SIM 210-a, SIM 210-b) based on the respective capabilities and rankings, irrespective of called number.

For example, a call (e.g., a video call, an XR video call, a video call associated with a gaming application) may be initiated using SIM 205-a of UE 115-a, where the call is designated for SIM 210-a of UE 115-b (e.g., based on a phone number associated with SIM 210-a). Base station 105-a may determine or identify that capabilities associated with SIM 210-b of UE 115-b may provide an improved user experience (e.g., higher data rate, higher QoS) for the call, for example, based on LUT 215. Base station 105-a may also determine or identify that SIM 210-b has a higher ranking compared to SIM 210-a. In some examples, base station 105-a may route (e.g., reroute) the call to SIM 210-b of UE 115-b, instead of routing the call to SIM 210-a.

In some additional examples, base station 105-a may route (or reroute) and establish calls between SIMs 205 (e.g., SIM 205-a or SIM 205-b) of UE 115-a and SIMS 210 (e.g., SIM 210-a or SIM 210-b) of UE 115-b, based on SIM capability, in addition to using some approaches associated with routing or call establishment based on "called number" or "out of coverage-based call forwarding." In some aspects, base station 105-a may refer to the LUT 215 (where the LUT 215 may be or include a metadata ranking matrix table) which may include information that matches between factors such as a caller or calling party application(s) profile, SIM network capability, or RAT associated features.

Aspects of the techniques described herein may be implemented at the network level (e.g., by base station 105-a). In some example cases, base station 105-a may determine the capabilities and rankings associated with SIMs 210 of a receiver UE 115 (e.g., UE 115-b) by accessing the LUT 215, and without connecting to the receiver UE 115 (e.g., UE 115-b). For example, base station 105-a may determine the capabilities and rankings associated with SIMs 210 of the receiver UE 115 (e.g., UE 115-b) during a scanning phase including a mobile switching center (MSC), base station controller (BSC), home location register (HLR), and visitor location register (VLR), without revealing any privacy information associated with SIMs 210 to a calling party (e.g., UE 115-a).

FIG. 3 illustrates an example of an LUT 300 that supports SIM ranking and connection routing in accordance with aspects of the present disclosure. In some examples, the LUT 300 may implement aspects of wireless communications systems 100 or 200. The LUT 300 may be an example of the LUT 215 described with reference to FIG. 2. Example aspects of the LUT 300 are described with reference to FIG. 2.

In some aspects, the LUT 300 may include columns 305 through 340 and rows 345 through 355. Row 345 through row 355 may respectively be associated with SIMs (e.g., SIMs 205, SIMs 210) equipped in a UE 115 (e.g., UE 115-a, UE 115-b) included in a network (e.g., wireless communications system 200). Column 305 through column 340 may include identification information or characteristic information associated with the SIMs. Column 305 may include identification information associated with a SIM. For example, column 305 may include an MEID, ESN, or UDID of a UE 115 equipped with the SIM. In some cases, column 305 may include an ICCID associated with the SIM. Column 310 may include an IMEI associated with a SIM.

Column 315 may include a SIM type associated with a SIM. The SIM type may include, for example, RAT types (e.g., 3G, 4G, 5G) supported by the SIM. Column 320 may include an application profile and SIM capability associated with a SIM. In some aspects, the application profile and SIM capability may be indicated in terms of QoS features (e.g., bandwidth, latency) with respect to the application profile. For example, column 320 may indicate an application type of an application at a UE 115 initiating a call (e.g., an application at UE 115-a initiating a video call), along with QoS features (e.g., bandwidth, latency) with respect to the application. In some aspects, column 320 may indicate supported QoS features (e.g., bandwidth, latency) at SIMs at a receiving UE 115 (e.g., for SIMS 210 at UE 115-b) with respect to the application.

In some aspects, the network (e.g., wireless communications system 200, base station 105-a) may evaluate the supported QoS features (e.g., bandwidth, latency) with respect to the application for each SIM, and accordingly, rank the SIMs. For example, UE 115-a may initiate a call (e.g., a video call using a video application) with UE 115-b. Base station 105-a may evaluate supported QoS features (e.g., bandwidth, latency) with respect to the video application for SIM 210-a and SIM 210-b, and accordingly, rank SIM 210-a and SIM 210-b based on the evaluation.

Column 325 may include a capability of a network which a SIM (and the UE 115 equipped with the SIM) is connected to. For example, column 325 may include an indication of a RAT type (e.g., 4G, 5G) supported by the network. Column 330 may include a user history corresponding to different sets of coordinates. For example, the user history may include a SIM selection pattern associated with previously initiating or receiving a call with respect to the different sets of coordinates. For example, the user history may indicate which SIM of a UE 115 was selected or used for a previously initiated or received call.

Column 335 may include a current location (e.g., current set of coordinates) of a SIM. In some cases, column 335 may include a current location of a UE 115 equipped with the SIM. Column 340 may include a SIM ranking as determined by the network (e.g., wireless communications system 200, base station 105-a). The network (e.g., wireless communications system 200, base station 105-a) may determine the ranking based on the example techniques described herein.

Examples supporting proactive and intelligent SIM ranking based routing for enhanced QoS and user experience in accordance with aspects of the present disclosure are described herein with reference to UE 115-a, UE 115-b, SIMS 205, SIMS 210, and base station 105-a of FIG. 2 and the LUT 300 of FIG. 3.

In a first example (also referred to herein as a first example scenario), at UE 115-a, SIM 205-a may be associated with a telecommunications operator A (e.g., Verizon) and a first RAT (e.g., 4G). SIM 205-b may be associated with a telecommunications operator B (e.g., Sprint) and a second RAT (e.g., 5G). At UE 115-b, SIM 210-a may be associated with telecommunications operator B (e.g., Sprint) and the second RAT (e.g., 5G). SIM 210-a may support up to a 500 Mbps bandwidth and a latency of less than 5 ms. SIM 210-b may be associated with a telecommunications operator C (e.g., AT&T) and the first RAT (e.g., 4G). SIM 210-b may support a 50 Mbps bandwidth and a latency of about 60 ms.

In the first example, UE 115-a initiates a call (e.g., a video call, an XR video call, a video call associated with a gaming application) over a 5G capable network using SIM 205-b, where the call is designated for SIM 210-b of UE 115-b. UE 115-a transmits an indication 235 to base station 105-a for establishing communications for the call. According to the examples of aspects described herein, base station 105-a may determine the identification information and characteristic information associated with SIMs 205 (e.g., SIM 205-a and SIM 205-b) at UE 115-a and SIMs 210 (e.g., SIM 210-a and SIM 210-b) at UE 115-b, as described with respect to columns 305 through 340 of FIG. 3.

For example, base station 105-a may determine identification information and characteristic information of SIMs 205 (e.g., SIM 205-a and SIM 205-b) at UE 115-a according to Table 1A. Base station 105-a may determine identification information and characteristic information of SIMs 210 (e.g., SIM 210-a and SIM 210-b) at UE 115-b according to Table 1B. Table 1A and table 1B are examples of LUT 300.

using SIM 205-b and SIM 210-a) without revealing any private information to UE 115-a with respect to the SIMs 210 at UE 115-b.

Establishing the connection between UE 115-a and UE 115-b according to the first example described herein may reduce overhead at both UE 115-a and UE 115-b compared to some systems. For example, some systems may blindly establish the connection from SIM 205-b (e.g., 5G SIM) to SIM 210-b (e.g., a 4G SIM), which may result in a loss of 5G features or technology advantages at UE 115-b. Such blind establishment may fail to utilize capabilities of SIM 210-a (e.g., a 5G SIM) also equipped at UE 115-b. In some systems, ending a call and manually reestablishing a con-

TABLE 1A

| ID (MEID, ESN, UDID) | IMEI | SIM Type | App. Profile/ SIM Capability in terms of QoS features | Capability of Current Network | User History/ SIM Selection Pattern and Coordinates | Current Coordinates | SIM Ranking |
|---|---|---|---|---|---|---|---|
| SIM 1 | XYZ | 4G | N/A | Connected to 5G capable network | Location −1, 13, 15, 18, 20 | | |
| SIM 2 | 123 | 5G | XR virtual video call: Required bandwidth >200 Mbps Required latency <5 ms | Connected to 5G capable network | Location −11, 4, 6 | | Call originating via XR video appl. needs this QoS |

TABLE 1B

| ID (MEID, ESN, UDID) | IMEI | SIM Type | App. Profile/ SIM Capability in terms of QoS features | Capability of Current Network | User History/ SIM Selection Pattern and Coordinates | Current Coordinates | SIM Ranking |
|---|---|---|---|---|---|---|---|
| SIM 1 | ABC | 5G | Supports bandwidth up to 500 Mbps; Supports latency <5 ms | Connected to 5G capable network | Location −1,3,7,8,10 | | Higher rank (routed call) |
| SIM 2 | DEF | 4G | Supports bandwidth up to 50 Mbps; Supports latency equal to about 60 ms | Connected to 5G capable network | Location 2, 6, 4 | | Lower rank (call initially routed to this SIM) |

Based on the capabilities and ranking information included in LUT 300 (e.g., Table 1A and Table 1B), base station 105-a may determine or identify that capabilities associated with SIM 210-a of UE 115-b may provide an improved user experience (e.g., higher bandwidth up to 500 Mbps, latency less than or equal to 5 ms) for the call. For example, base station 105-a may route (e.g., reroute) the call to SIM 210-a of UE 115-b, instead of routing the call to SIM 210-b. Base station 105-a may establish the connection between UE 115-a and UE 115-b as described herein (e.g., nection (e.g., "calling back" to SIM 210-a (the 5G SIM)) may involve increased overhead compared to the first example described herein.

In an alternative of the first example, UE 115-a initiates a call (e.g., a video call, an XR video call, a video call associated with a gaming application) over a first RAT (e.g., 4G) capable network using SIM 205-a, where the call is designated for SIM 210-a of UE 115-b. Based on the capabilities and ranking information included in LUT 300, base station 105-a may determine or identify that SIM 210-a of UE 115-b supports up to a second RAT (e.g., 5G). In some aspects, base station 105-a may determine that establishing a connection using SIM 205-a (e.g., supporting 4G) and SIM 210-a (e.g., supporting 5G) would result in unnecessary bandwidth (spectrum) usage at UE 115-b, since SIM 205-a of UE 115-a (e.g., the calling party) only supports up to 4G. In an example, base station 105-a may route (e.g., reroute) the call to SIM 210-b (e.g., supporting 4G) of UE 115-b, instead of routing the call to SIM 210-a (e.g., supporting 5G). Base station 105-a may establish the connection between UE 115-a and UE 115-b as described herein (e.g., using SIM 205-a and SIM 210-b) without revealing any private information to UE 115-a with respect to the SIMs 210 at UE 115-b.

In a second example (also referred to herein as a second example scenario), UE 115-a may be located at a location X. At UE 115-a, SIM 205-a may be associated with a telecommunications operator A (e.g., Verizon) and a first RAT (e.g., 5G), and the first RAT (e.g., 5G) may be supported at the location X by the telecommunications operator A. SIM 205-b may be associated with a telecommunications operator B (e.g., Sprint) and the first RAT (e.g., 5G), and the first RAT (e.g., 5G) may be supported at the location X by the telecommunications operator B.

UE 115-b may be located at a location Y. At UE 115-b, SIM 210-a may be associated with telecommunications operator B (e.g., Sprint) and the first RAT (e.g., 5G), and the first RAT (e.g., 5G) may be supported at the location Y by the telecommunications operator B. SIM 210-a may support up to a 200 Mbps bandwidth and a latency of 5 ms. SIM 210-b may be associated with telecommunications operator C (e.g., AT&T) and the first RAT (e.g., 5G), but only a second RAT (e.g., 4G) may be supported at the location Y by the telecommunications operator C. SIM 210-b may support a 50 Mbps bandwidth and a latency of about 60 ms.

In the second example, UE 115-a initiates a call (e.g., a video call, an XR video call, a video call associated with a gaming application) over a 5G capable network using SIM 205-b, where the call is designated for SIM 210-b of UE 115-b. UE 115-a transmits an indication 235 to base station 105-a for establishing communications for the call. According to the examples of aspects described herein, base station 105-a may determine the identification information and characteristic information associated with SIMs 205 (e.g., SIM 205-a and SIM 205-b) at UE 115-a and SIMs 210 (e.g., SIM 210-a and SIM 210-b) at UE 115-b, as described with respect to columns 305 through 340 of FIG. 3.

For example, base station 105-a may determine identification information and characteristic information of SIMs 205 (e.g., SIM 205-a and SIM 205-b) at UE 115-a according to Table 2A. Base station 105-a may determine identification information and characteristic information of SIMs 210 (e.g., SIM 210-a and SIM 210-b) at UE 115-b according to Table 2B. Table 2A and table 2B are examples of LUT 300.

TABLE 2A

| ID (MEID, ESN, UDID) | IMEI | SIM Type | App. Profile/ SIM Capability in terms of QoS features | Capability of Current Network | User History/ SIM Selection Pattern and Coordinates | Current Coordinates | SIM Ranking |
|---|---|---|---|---|---|---|---|
| SIM 1 | XYZ | 5G | N/A | Connected to 5G capable network | Location −1, 13, 15, 18, 20 | | |
| SIM 2 | 123 | 5G | XR virtual video call: Required bandwidth >200 Mbps Required latency <5 ms | Connected to 5G capable network | Location −11, 4, 6 | | Call originating via XR video appl. needs this QoS |

TABLE 2B

| ID (MEID, ESN, UDID) | IMEI | SIM Type | App. Profile/ SIM Capability in terms of QoS features | Capability of Current Network | User History/ SIM Selection Pattern and Coordinates | Current Coordinates | SIM Ranking |
|---|---|---|---|---|---|---|---|
| SIM 1 | ABC | 5G | Supports bandwidth up to 200 Mbps; Supports latency = 5 ms | Connected to 5G capable network | Location −1, 3, 7, 8, 10 | | Higher rank (routed call) |
| SIM 2 | DEF | 4G | Supports bandwidth up to 50 Mbps; Supports latency = 60 ms | Connected to 4G capable network | Location 2, 6, 4 | | Lower rank (call initially routed to this SIM) |

Based on the capabilities and ranking information included in LUT 300 (e.g., Table 2A and Table 2B), base station 105-*a* may determine or identify that capabilities associated with SIM 210-*a* of UE 115-*b* may provide an improved user experience (e.g., higher bandwidth up to 200 Mbps, latency less than or equal to 5 ms) for the call based on the location Y of UE 115-*b*. For example, base station 105-*a* may route (e.g., reroute) the call to SIM 210-*a* of UE 115-*b*, instead of routing the call to SIM 210-*b*. Base station 105-*a* may establish the connection between UE 115-*a* and UE 115-*b* as described herein (e.g., using SIM 205-*b* and SIM 210-*a*) without revealing any private information to UE 115-*a* with respect to the SIMs 210 of UE 115-*b*.

Establishing the connection between UE 115-*a* and UE 115-*b* according to the first example described herein may reduce overhead at both UE 115-*a* and UE 115-*b* compared to some systems. For example, some systems may blindly establish the connection from SIM 205-*b* (e.g., 5G SIM) to SIM 210-*b* (e.g., a 5G SIM), regardless of location of UEs 115 respectively equipped with the SIMs (e.g., regardless of location Y of UE 115-*b* equipped with SIM 210-*b*). Such blind establishment may result in a loss of 5G features or technology advantages at UE 115-*b* for cases in which a telecommunications operator associated with the SIM 210-*b* does not support 5G at location Y. Such blind establishment may fail to utilize capabilities of SIM 210-*a* (e.g., a 5G SIM associated with telecommunications operator B which supports 5G at location Y) also equipped at UE 115-*b*. In some systems, ending a call and manually reestablishing a connection (e.g., "calling back" to SIM 210-*a*) may involve increased overhead compared to the second example described herein.

In a third example (also referred to herein as a third example scenario), UE 115-*a* may be located at a location X. At UE 115-*a*, SIM 205-*a* may be associated with a telecommunications operator A (e.g., Verizon) and a first RAT (e.g., 5G), and the first RAT (e.g., 5G) may be supported at the location X by the telecommunications operator A. SIM 205-*b* may be associated with a telecommunications operator B (e.g., Sprint) and the first RAT (e.g., 5G), and the first RAT (e.g., 5G) may be supported at the location X by the telecommunications operator B.

At UE 115-*b*, SIM 210-*a* may be associated with telecommunications operator B (e.g., Sprint) and a second RAT (e.g., 4G). SIM 210-*a* may support up to a 50 Mbps bandwidth and a latency of 60 ms. SIM 210-*b* may be associated with telecommunications operator C (e.g., AT&T) and the second RAT (e.g., 4G). SIM 210-*b* may support a 50 Mbps bandwidth and a latency of 60 ms.

In the third example, UE 115-*a* initiates a call (e.g., a video call, an XR video call, a video call associated with a gaming application) over a 5G capable network using SIM 205-*b*, where the call is designated for SIM 210-*b* of UE 115-*b*. UE 115-*a* transmits an indication 235 to base station 105-*a* for establishing communications for the call. According to the examples of aspects described herein, base station 105-*a* may determine the identification information and characteristic information associated with SIMs 205 (e.g., SIM 205-*a* and SIM 205-*b*) at UE 115-*a* and SIMs 210 (e.g., SIM 210-*a* and SIM 210-*b*) at UE 115-*b*, as described with respect to columns 305 through 340 of FIG. 3.

For example, base station 105-*a* may determine identification information and characteristic information of SIMs 205 (e.g., SIM 205-*a* and SIM 205-*b*) at UE 115-*a* according to Table 3A. Base station 105-*a* may determine identification information and characteristic information of SIMs 210 (e.g., SIM 210-*a* and SIM 210-*b*) at UE 115-*b* according to Table 3B. Table 3A and table 3B are examples of LUT 300.

TABLE 3A

| ID (MEID, ESN, UDID) | IMEI | SIM Type | App. Profile/ SIM Capability in terms of QoS features | Capability of Current Network | User History/ SIM Selection Pattern and Coordinates | Current Coordinates | SIM Ranking |
|---|---|---|---|---|---|---|---|
| SIM 1 | XYZ | 5G | N/A | Connected to 5G capable network | Location −1, 13, 15, 18, 20 | | |
| SIM 2 | 123 | 5G | XR virtual video call: Required bandwidth >200 Mbps Required latency <5 ms | Connected to 5G capable network | Location −11, 4, 6 | | Call originating via XR video appl. needs this QoS |

TABLE 3B

| ID (MEID, ESN, UDID) | IMEI | SIM Type | App. Profile/ SIM Capability in terms of QoS features | Capability of Current Network | User History/ SIM Selection Pattern and Coordinates | Current Coordinates | SIM Ranking |
|---|---|---|---|---|---|---|---|
| SIM 1 | ABC | 4G | Supports bandwidth up to 50 Mbps; Supports latency = 60 ms | Connected to 4G capable network | Location −1, 3, 7, 8, 10 | | Lower rank (no SIM can match calling application request) |

TABLE 3B-continued

| ID (MEID, ESN, UDID) | IMEI | SIM Type | App. Profile/ SIM Capability in terms of QoS features | Capability of Current Network | User History/ SIM Selection Pattern and Coordinates | Current Coordinates | SIM Ranking |
| --- | --- | --- | --- | --- | --- | --- | --- |
| SIM 2 | DEF | 4G | Supports bandwidth up to 50 Mbps; Supports latency = 60 ms | Connected to 4G capable network | Location 2, 6, 4 | | Lower rank (no SIM can match calling application request) |

Based on the capabilities and ranking information included in LUT 300 (e.g., Table 2A and Table 2B), base station 105-a may determine or identify that SIM 210-a of UE 115-b may provide an improved user experience for the call, based on SIM 205-b and SIM 210-a both being associated with the same telecommunications operator B (e.g., Sprint). For example, base station 105-a may route (e.g., reroute) the call to SIM 210-a of UE 115-b, instead of routing the call to SIM 210-b. Base station 105-a may establish the connection between UE 115-a and UE 115-b as described herein (e.g., using SIM 205-b and SIM 210-a) without revealing any private information to UE 115-a with respect to the SIMs 210 of UE 115-b.

Additionally, or alternatively, based on the capabilities and ranking information included in LUT 300 (e.g., Table 3A and Table 3B), base station 105-a may determine or identify that capabilities associated with SIM 210-a and SIM 210-b of UE 115-b do not support the first RAT (e.g., 5G). In some aspects, base station 105-a may determine or identify that the network that SIM 210-a and SIM 210-b are connected to also does not support the first RAT (e.g., 5G).

Base station 105-a may transmit, to UE 115-a, a request 240 to establish the connection with SIM 210-a based on the second RAT (e.g., 4G). The request 240 may include an indication of a set of capabilities associated with SIM 205-b (e.g., the SIM used by UE 115-a for originating the call or connection) and SIM 210-b (e.g., proposed recipient SIM at UE 115-b). The request 240 may include a prompt for a user input. For example, UE 115-a may display or output a prompt requesting a user input to confirm establishing the connection using the second RAT (e.g., 4G). In an example, the prompt may include a message such as "Connect using a lower resolution which the second RAT (e.g., 4G) can support, or drop call?"

UE 115-a may transmit a response accepting the request 240, and base station 105-a may establish the connection based on the second RAT (e.g., 4G) and the corresponding latency and bandwidth. Base station 105-a may establish the connection between UE 115-a and UE 115-b as described herein (e.g., using SIM 205-b and SIM 210-a) without revealing any private information to UE 115-a with respect to the SIMs 210 of UE 115-b.

Establishing the connection between UE 115-a and UE 115-b according to the third example described herein may mitigate any losses of network resources associated with the first RAT (e.g., 5G) at UE 115-a, compared to some systems. For example, some systems may blindly establish the connection from SIM 205-b (e.g., 5G SIM) to SIM 210-b (e.g., a 4G SIM), regardless of network capabilities associated with the SIMs, and thus wasting network resources associated with the first RAT (e.g., 5G).

In some cases, establishing the connection between UE 115-a and UE 115-b according to the third example (e.g., using a lower resolution which the second RAT (e.g., 4G) can support) may provide opportunities for the calling application at UE 115-a to modify its transmissions (e.g., reduce quality of transmitted video or audio) in line with capability at UE 115-b. In some aspects, UE 115-a may drop or pause features otherwise incompatible with communications over the second RAT (e.g., 4G), which may save resources and reduce load processing at UE 115-a, improving communication quality between UE 115-a and UE 115-b.

In a fourth example (also referred to herein as a fourth example scenario), UE 115-a may be located at a location X. At UE 115-a, SIM 205-a may be associated with a telecommunications operator A (e.g., Verizon) and a first RAT (e.g., 5G), and the first RAT (e.g., 5G) may be supported at the location X by the telecommunications operator A. SIM 205-b may be associated with a telecommunications operator B (e.g., Sprint) and the first RAT (e.g., 5G), and the first RAT (e.g., 5G) may be supported at the location X by the telecommunications operator B.

At UE 115-b, SIM 210-a may be associated with telecommunications operator B (e.g., Sprint) and the first RAT (e.g., 5G), and the first RAT (e.g., 5G) may be supported by the telecommunications operator B. UE 115-b may be located at a location Y. SIM 210-a may support up to a 200 Mbps bandwidth and a latency of 5 ms. SIM 210-b may be associated with telecommunications operator C (e.g., AT&T) and the first RAT (e.g., 5G), but the first RAT (e.g., 5G) may not be supported by the telecommunications operator C for locations other than a location Y. SIM 210-b may support a 50 Mbps bandwidth and a latency of about 60 ms.

In the fourth example, UE 115-a initiates a call (e.g., a video call, an XR video call, a video call associated with a gaming application) over a 5G capable network using SIM 205-b, where the call is designated for SIM 210-b of UE 115-b at a location Y. UE 115-a transmits an indication 235 to base station 105-a for establishing communications for the call. According to the examples of aspects described herein, base station 105-a may determine the identification information and characteristic information associated with SIMs 205 (e.g., SIM 205-a and SIM 205-b) at UE 115-a and SIMs 210 (e.g., SIM 210-a and SIM 210-b) at UE 115-b, as described with respect to columns 305 through 340 of FIG. 3.

For example, base station 105-a may determine identification information and characteristic information of SIMs 205 (e.g., SIM 205-a and SIM 205-b) at UE 115-a according to Table 4A. Base station 105-a may determine identification information and characteristic information of SIMs 210

(e.g., SIM 210-*a* and SIM 210-*b*) at UE 115-*b* according to Table 4B. Table 4A and table 4B are examples of LUT 300.

TABLE 4A

| ID (MEID, ESN, UDID) | IMEI | SIM Type | App. Profile/ SIM Capability in terms of QoS features | Capability of Current Network | User History/ SIM Selection Pattern and Coordinates | Current Coordinates | SIM Ranking |
|---|---|---|---|---|---|---|---|
| SIM 1 | XYZ | 5G | N/A | Connected to 5G capable network | Location -1, 13, 15, 18, 20 | | |
| SIM 2 | 123 | 5G | XR virtual video call: Required bandwidth >200 Mbps Required latency <5 ms | Connected to 5G capable network | Location -11, 4, 6 | | Call originating via XR video appl. needs this QoS |

TABLE 4B

| ID (MEID, ESN, UDID) | IMEI | SIM Type | App. Profile/ SIM Capability in terms of QoS features | Capability of Current Network | User History/ SIM Selection Pattern and Coordinates | Current Coordinates | SIM Ranking |
|---|---|---|---|---|---|---|---|
| SIM 1 | ABC | 5G | Supports bandwidth up to 200 Mbps; Supports latency = 5 ms | Connected to 5G capable network | Location -1,3,7,8,10 | 7, matches with user history of "higher call activity from SIM1 at this location" | Higher rank (routed call) |
| SIM 2 | DEF | 4G | Supports bandwidth up to 50 Mbps; Supports latency = 60 ms | Connected to 5G capable network | Location 2, 6, 4 | | Lower rank (call initially routed to this SIM) |

Based on the capabilities included in LUT 300 (e.g., Table 4A and Table 4B), base station 105-*a* may determine ranking information for SIM 210-*a* and SIM 210-*b* based on a usage history and SIM selection pattern with respect to different sets of coordinates. For example, base station 105-*a* may assign a higher rank to SIM 210-*a* based on a user history corresponding to different sets of coordinates (e.g., the frequency in which a SIM is selected when initiating or receiving a call while UE 115-*b* is located at a set of coordinates). In some examples, base station 105-*a* may rank SIMs based on a user preferences (e.g., SIM selection preferences) corresponding to the different sets of coordinates.

Based on the user history, for example, base station 105-*a* may determine that capabilities associated with SIM 210-*a* of UE 115-*b* may provide an improved user experience (e.g., improved call quality, signal strength, etc.) for the call. For example, base station 105-*a* may route (e.g., reroute) the call to SIM 210-*a* of UE 115-*b*, instead of routing the call to SIM 210-*b*. Base station 105-*a* may establish the connection between UE 115-*a* and UE 115-*b* as described herein (e.g., using SIM 205-*b* and SIM 210-*a*) without revealing any private information to UE 115-*a* with respect to the SIMs 210 of UE 115-*b*.

Establishing the connection between UE 115-*a* and UE 115-*b* according to the fourth example described herein may reduce overhead at both UE 115-*a* and UE 115-*b* compared to some systems. For example, some systems may blindly establish the connection from SIM 205-*b* (e.g., 5G SIM) to SIM 210-*b* (e.g., a 5G SIM), regardless of user history or user preferences. Such blind establishment may result in a reduction of QoS at UE 115-*b*. In some systems, ending a call and manually reestablishing a connection (e.g., "calling back" to SIM 210-*a*) may involve increased overhead compared to the fourth example described herein.

According to the aspects of the first through fourth examples (first through fourth example scenarios) described herein, the network (e.g., wireless communications system 200, base station 105-*a*) may manage and update ranking information included in the LUT 215 for SIMs of UEs 115 connected to (or previously connected to) the network. For example, as described with respect to the first and second examples (first and second example scenarios), the network (e.g., wireless communications system 200, base station 105-*a*) may determine the ranking information based on a QoS (e.g., QoS demand) associated with an application on UE 115-*a*. In an example, the network may rank SIMs based on whether the SIMs support a QoS (e.g., bandwidth, network latency) associated with the application.

As described with respect to the first and second examples (first and second example scenarios), the network (e.g., wireless communications system 200, base station 105-a) may determine the ranking information based on an application on UE 115-a and a QoS (e.g., QoS demand) associated with a user profile stored on UE 115-a. For example, the network may rank SIMs based on whether the SIMs support a QoS (e.g., bandwidth, network latency) associated with the application and the user profile. As described with respect to the first and second examples (first and second example scenarios), the network (e.g., wireless communications system 200, base station 105-a) may determine the ranking information based on a RAT feature on which an application on UE 115-a may depend. For example, the network may rank SIMs based on whether the SIMs support a RAT feature on which the application on UE 115-a may depend (e.g., for exchanging data, for network or data security, for performance metrics such as key performance indicators (KPIs)).

As described with respect to the third example (third example scenario), the network (e.g., wireless communications system 200, base station 105-a) may determine the ranking information based on RAT type and features associated with the RAT type. For example, the network may rank SIMs based on RAT specific features supported by the SIMs, for a RAT which UE 115-a or UE 115-b is currently using to connect to the network. For example, the network may rank SIMs based on availability of RATs associated with the SIMs with respect to sets of coordinates. In some aspects, the network may rank the SIMs to identify SIMs which may support a QoS (e.g., bandwidth, network latency) associated with an application on a UE 115 (e.g., UE 115-a, UE 115-b) for a set of coordinates.

As described with respect to the fourth example (fourth example scenario), the network (e.g., wireless communications system 200, base station 105-a) may determine the ranking information based on a usage history and SIM selection pattern based on different sets of coordinates. For example, the network may rank SIMs based on a user history (e.g., SIM selection when initiating or receiving a call) corresponding to different sets of coordinates. In some examples, the network may rank SIMs based on a user preferences (e.g., SIM selection preferences) corresponding to the different sets of coordinates. The user history and user preferences may be stored in the LUT 215.

Figure 4:
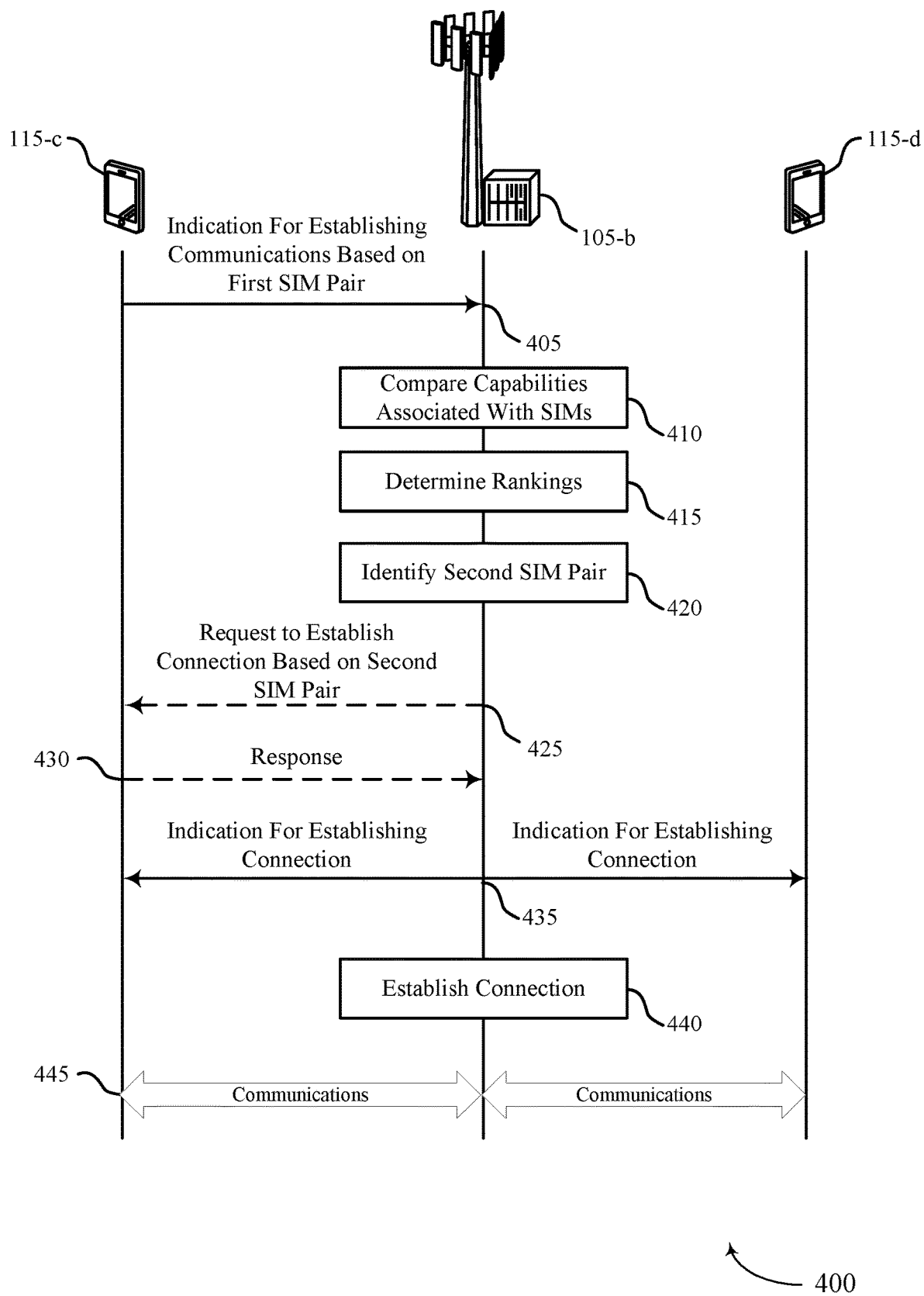
FIG. 4 illustrates an example of a process flow that supports SIM ranking and connection routing in accordance with aspects of the present disclosure.

FIG. 4 illustrates an example of a process flow 400 that supports SIM ranking and connection routing in accordance with aspects of the present disclosure. In some examples, process flow 400 may implement aspects of wireless communications systems 100 or 200. Additionally, process flow 400 may implement aspects of LUT 300. Process flow 400 may be implemented by a UE 115-c and a UE 115-d, which may be examples of a UE 115, UE 115-a, or UE 115-b described with reference to FIGS. 1 and 2. Process flow 400 may be implemented by a base station 105-b, which may be an examples of a base station 105 or base station 105-a described with reference to FIGS. 1 and 2.

In the following description of the process flow 400, the operations between UE 115-c, UE 115-d, and base station 105-b may be transmitted in a different order than the order shown, or the operations performed by UE 115-c, UE 115-d, and base station 105-b may be performed in different orders or at different times. Certain operations may also be left out of the process flow 400, or other operations may be added to the process flow 400. It is to be understood that while UE 115-c, UE 115-d, and base station 105-b are shown performing a number of the operations of process flow 400, any wireless device may perform the operations shown.

At 405, base station 105-b may receive an indication from UE 115-c for establishing communications between UE 115-c and UE 115-d based on a first SIM pair, the first SIM pair including a first SIM from a first set of SIMs of the UE 115-c and a second SIM of a second set of SIMs of the UE 115-d.

At 410, base station 105-b may compare a first set of capabilities associated with the first set of SIMs and a second set of capabilities associated with the second set of SIMs based on the indication for establishing the communications between the UE 115-c and the UE 115-d. In some cases, the indication for establishing the communications may include a QoS associated with one or more of an application on the UE 115-c or a user profile. In some aspects, comparing the first set of capabilities associated with the first set of SIMs and the second set of capabilities associated with the second set of SIMs may be based on the QoS. In some other cases, the indication for establishing the communications may include a RAT associated with an application of the UE 115-c. In some aspects, comparing the first set of capabilities associated with the first set of SIMs and the second set of capabilities associated with the second set of SIMs may be based on the RAT associated with the application.

At 415, base station 105-b may determine a set of rankings associated with the second set of SIMs based on the first set of capabilities associated with the first set of SIMs and the second set of capabilities associated with the second set of SIMs. In some cases, determining the set of rankings associated with the second set of SIMS may be based on a LUT including at least the set of rankings associated with the second set of SIMS.

At 420, base station 105-b may identify a second SIM pair between a first candidate SIM from the first set of SIMs and a second candidate SIM from the second set of SIMs for a connection for establishing the communications between the UE 115-c and the UE 115-d, based on the comparing the first set of capabilities with the second set of capabilities.

In some examples, at 425, base station 105-c may transmit a request to UE 115-c to establish the connection based on the second SIM pair, the request including an indication of a set of capabilities associated with one or more of the first SIM, the second SIM, the first candidate SIM, or the second candidate SIM.

In some examples, at 430, base station 105-b may receive a response from UE 115-c accepting the request.

At 435, base station 105-b may transmit to UE 115-c and UE 115-d, an indication for establishing the connection between the UE 115-c and the UE 115-d.

At 440, base station 105-b may establish the connection between the UE 115-c and the UE 115-d based on the second SIM pair. In some aspects, base station 105-b may establish the connection based on the response received at 430.

At 445, UE 115-c and UE 115-d may communicate based on the established connection using the second SIM pair.

Figure 5:
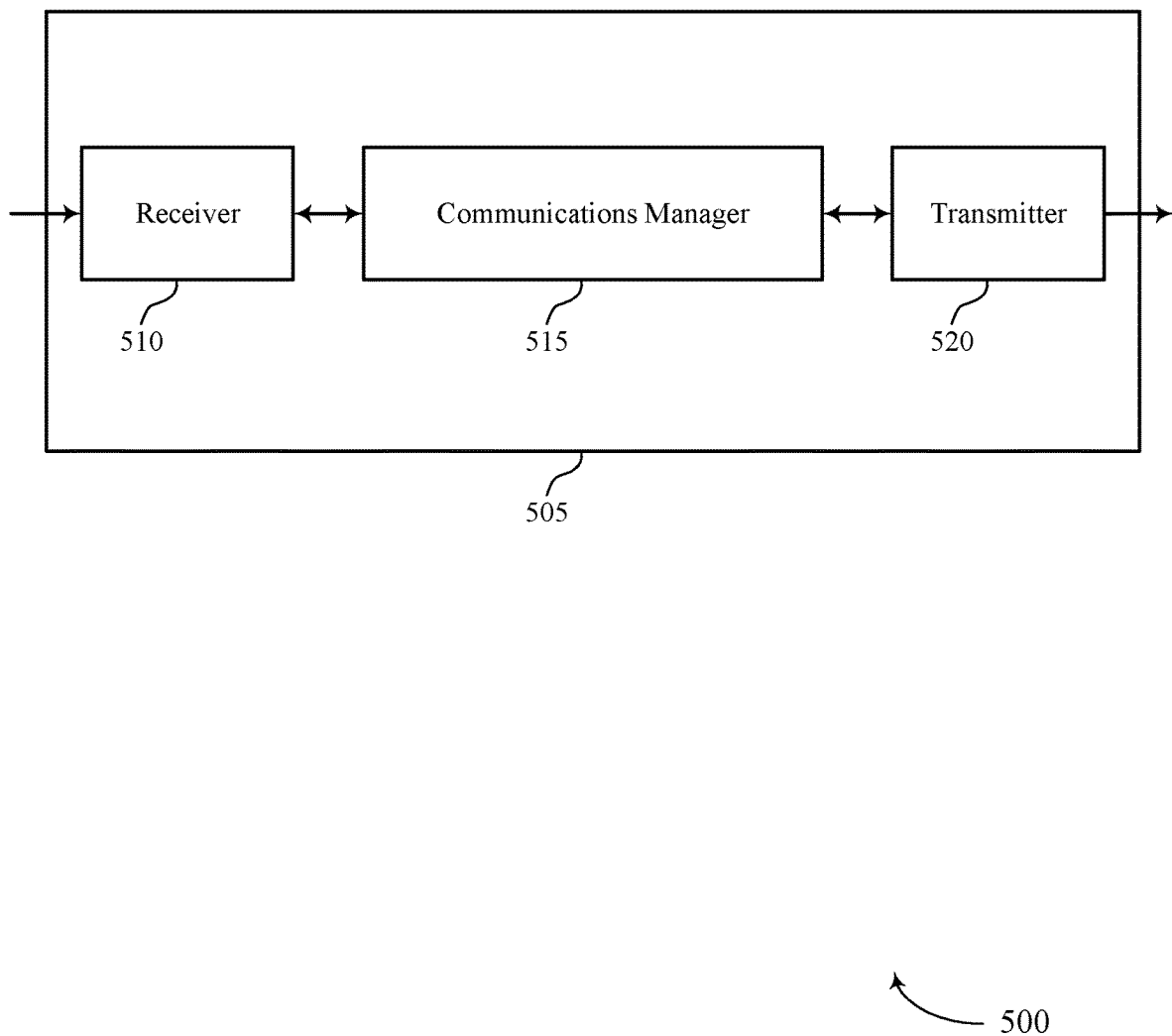
FIGS. 5 and 6 show block diagrams of devices that support SIM ranking and connection routing in accordance with aspects of the present disclosure.

FIG. 5 shows a block diagram 500 of a device 505 that supports SIM ranking and connection routing in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to SIM ranking and connection routing, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station, an indication for establishing communications between a first device and a second device based on a first SIM pair, the first SIM pair including a first SIM from a set of SIMs of the first device and a second SIM of a second set of SIMs of the second device and establish a connection for the communications between the first device and the second device based on a second SIM pair including a first candidate SIM from the first set of SIMs and a second candidate SIM from the second set of SIMs, where the second SIM pair is based on a first set of capabilities associated with the first set of SIMs and a second set of capabilities associated with the second set of SIMs. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
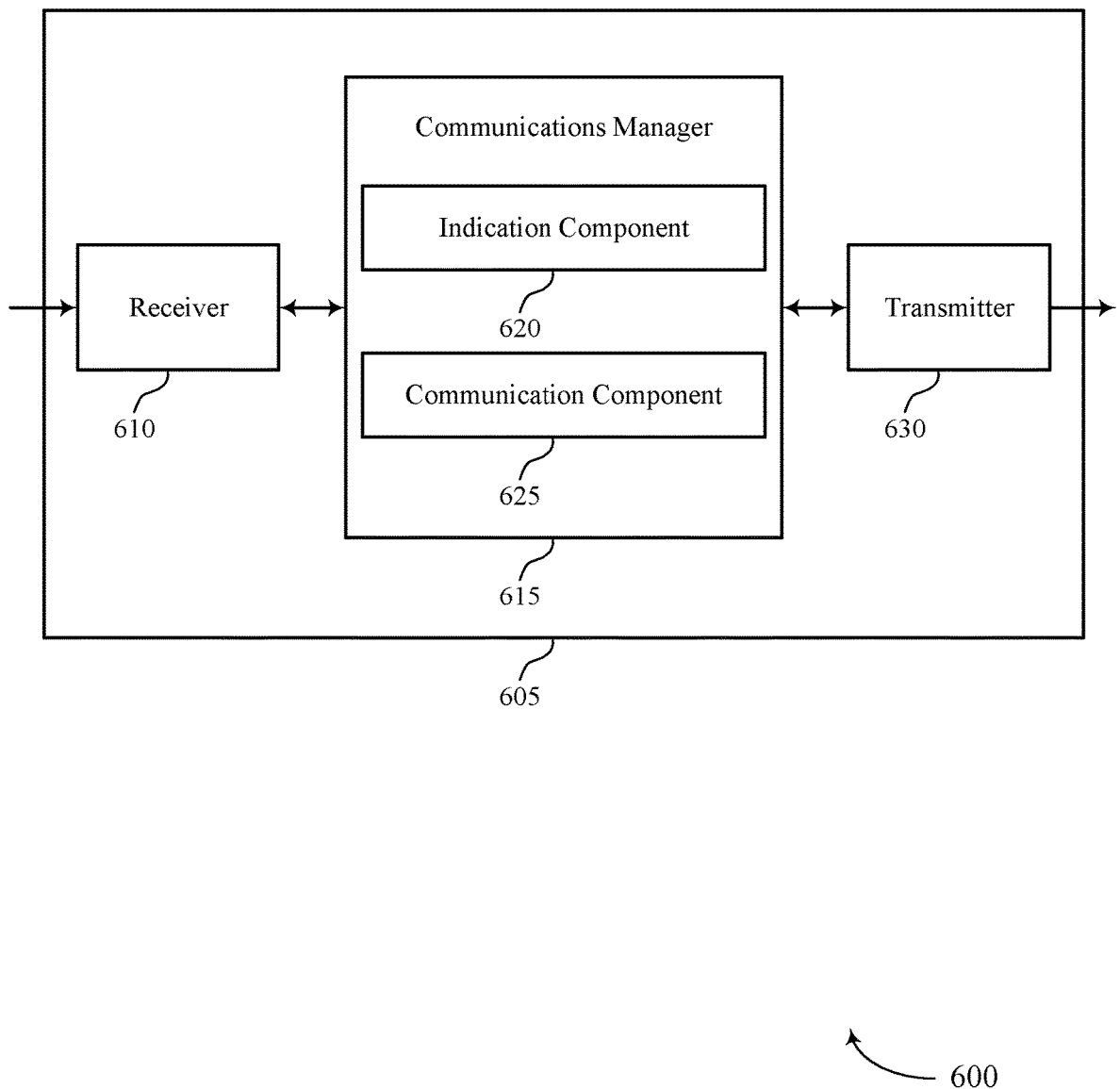

FIG. 6 shows a block diagram 600 of a device 605 that supports SIM ranking and connection routing in accordance with aspects of the present disclosure. The device 605 may be an example of aspects of a device 505, or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to SIM ranking and connection routing, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an indication component 620 and a communication component 625. The communications manager 615 may be an example of aspects of the communications manager 810 described herein.

The indication component 620 may transmit, to a base station, an indication for establishing communications between a first device and a second device based on a first SIM pair, the first SIM pair including a first SIM from a set of SIMs of the first device and a second SIM of a second set of SIMs of the second device.

The communication component 625 may establish a connection for the communications between the first device and the second device based on a second SIM pair including a first candidate SIM from the first set of SIMs and a second candidate SIM from the second set of SIMs, where the second SIM pair is based on a first set of capabilities associated with the first set of SIMs and a second set of capabilities associated with the second set of SIMs.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
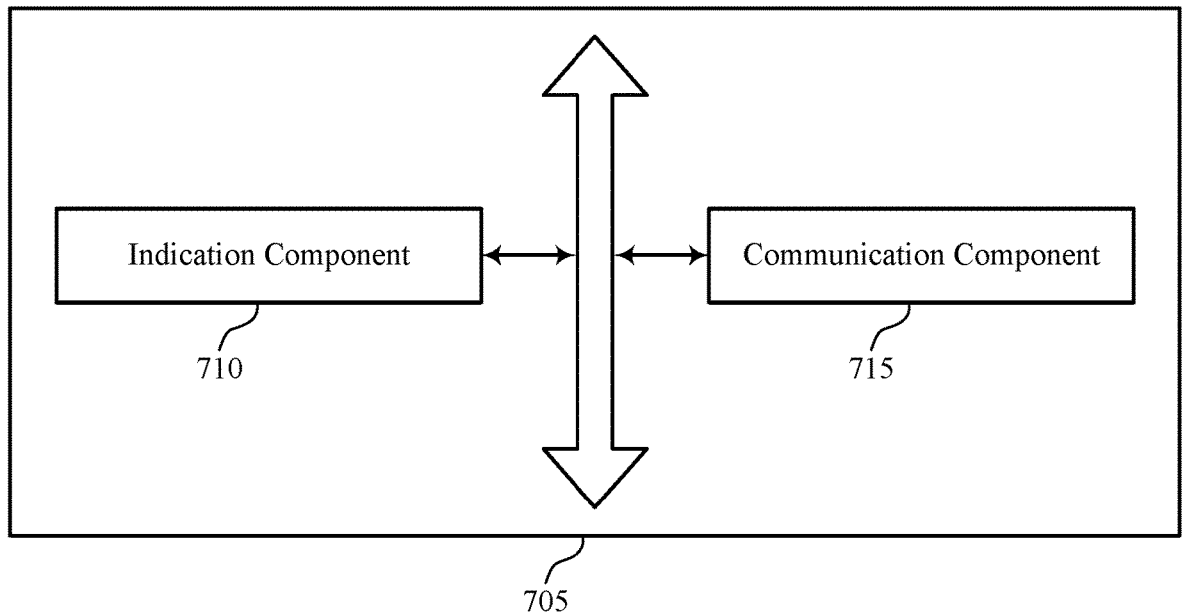
FIG. 7 shows a block diagram of a communications manager that supports SIM ranking and connection routing in accordance with aspects of the present disclosure.
Figure 7:

FIG. 7 shows a block diagram 700 of a communications manager 705 that supports SIM ranking and connection routing in accordance with aspects of the present disclosure. The communications manager 705 may be an example of aspects of a communications manager 515, a communications manager 615, or a communications manager 810 described herein. The communications manager 705 may include an indication component 710, a communication component 715, and a pairing component 720. Each of these modules may communicate, directly or indirectly, with one another (e.g., via one or more buses).

The indication component 710 may transmit, to a base station, an indication for establishing communications between a first device and a second device based on a first SIM pair, the first SIM pair including a first SIM from a set of SIMs of the first device and a second SIM of a second set of SIMs of the second device.

The communication component 715 may establish a connection for the communications between the first device and the second device based on a second SIM pair including a first candidate SIM from the first set of SIMs and a second candidate SIM from the second set of SIMs, where the second SIM pair is based on a first set of capabilities associated with the first set of SIMs and a second set of capabilities associated with the second set of SIMs.

In some examples, the communication component 715 may receive, from the base station, a request to establish the connection based on the second SIM pair, the request including an indication of a set of capabilities associated with one or more of the first SIM, the second SIM, the first candidate SIM, or the second candidate SIM.

In some examples, the communication component 715 may transmit, to the base station, a response accepting the request, where establishing the connection based on the second SIM pair is based on transmitting the response.

In some cases, the first SIM is associated with a first RAT. In some cases, the second SIM is associated with a second RAT different from the first RAT. In some cases, the first candidate SIM includes the first SIM. In some cases, the second candidate SIM includes a SIM that is different from the second SIM and associated with the first RAT.

In some cases, the first SIM is associated with a first RAT. In some cases, the second SIM is associated with the first RAT, where a first set of network capabilities associated with the second SIM with respect to a first set of coordinates fail to satisfy a threshold, and a second set of network capabilities associated with the second SIM with respect to a second set of coordinates satisfy the threshold. In some cases, the first candidate SIM includes the first SIM. In some cases, the second candidate SIM includes a SIM that is different from the second SIM and associated with the first RAT, where a set of network capabilities associated with the second candidate SIM with respect to the first set of coordinates satisfy the threshold.

In some cases, the first SIM is associated with a first RAT, where a set of network capabilities of the first SIM includes a first set of network capabilities supporting the first RAT and a second set of network capabilities supporting a second RAT different from the first RAT. In some cases, the second SIM is associated with the second RAT. In some cases, the first candidate SIM includes the first SIM, where the first SIM is configured for using the second set of network capabilities supporting the second RAT. In some cases, the second candidate SIM includes the second SIM.

In some cases, the second device is located at a first set of coordinates. In some cases, the first SIM is associated with a first RAT. In some cases, the second SIM is associated with the first RAT, where a profile associated with the second SIM includes an indication of establishing one or more previous connections using the first RAT at a second set of coordinates. In some cases, the first candidate SIM includes the first SIM. In some cases, the second candidate SIM includes a SIM that is different from the second SIM and associated with the first RAT, where a profile associated with the second candidate SIM includes an indication of establishing one or more previous connections using the first RAT at the first set of coordinates.

Figure 8:
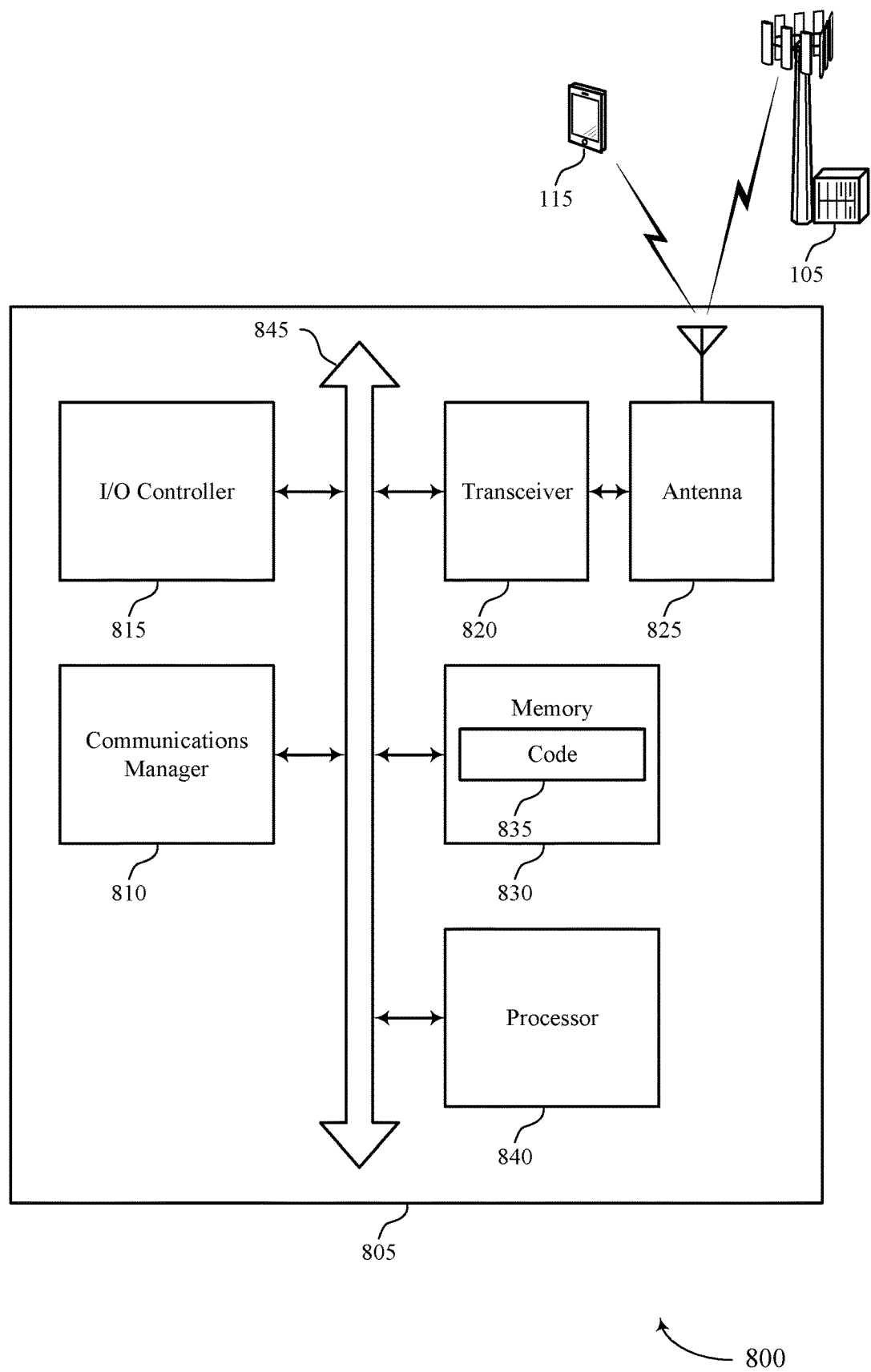
FIG. 8 shows a diagram of a system including a device that supports SIM ranking and connection routing in accordance with aspects of the present disclosure.

FIG. 8 shows a diagram of a system 800 including a device 805 that supports SIM ranking and connection routing in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a base station, an indication for establishing communications between a first device and a second device based on a first SIM pair, the first SIM pair including a first SIM from a set of SIMs of the first device and a second SIM of a second set of SIMs of the second device and establish a connection for the communications between the first device and the second device based on a second SIM pair including a first candidate SIM from the first set of SIMs and a second candidate SIM from the second set of SIMs, where the second SIM pair is based on a first set of capabilities associated with the first set of SIMs and a second set of capabilities associated with the second set of SIMs.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting SIM ranking and connection routing).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
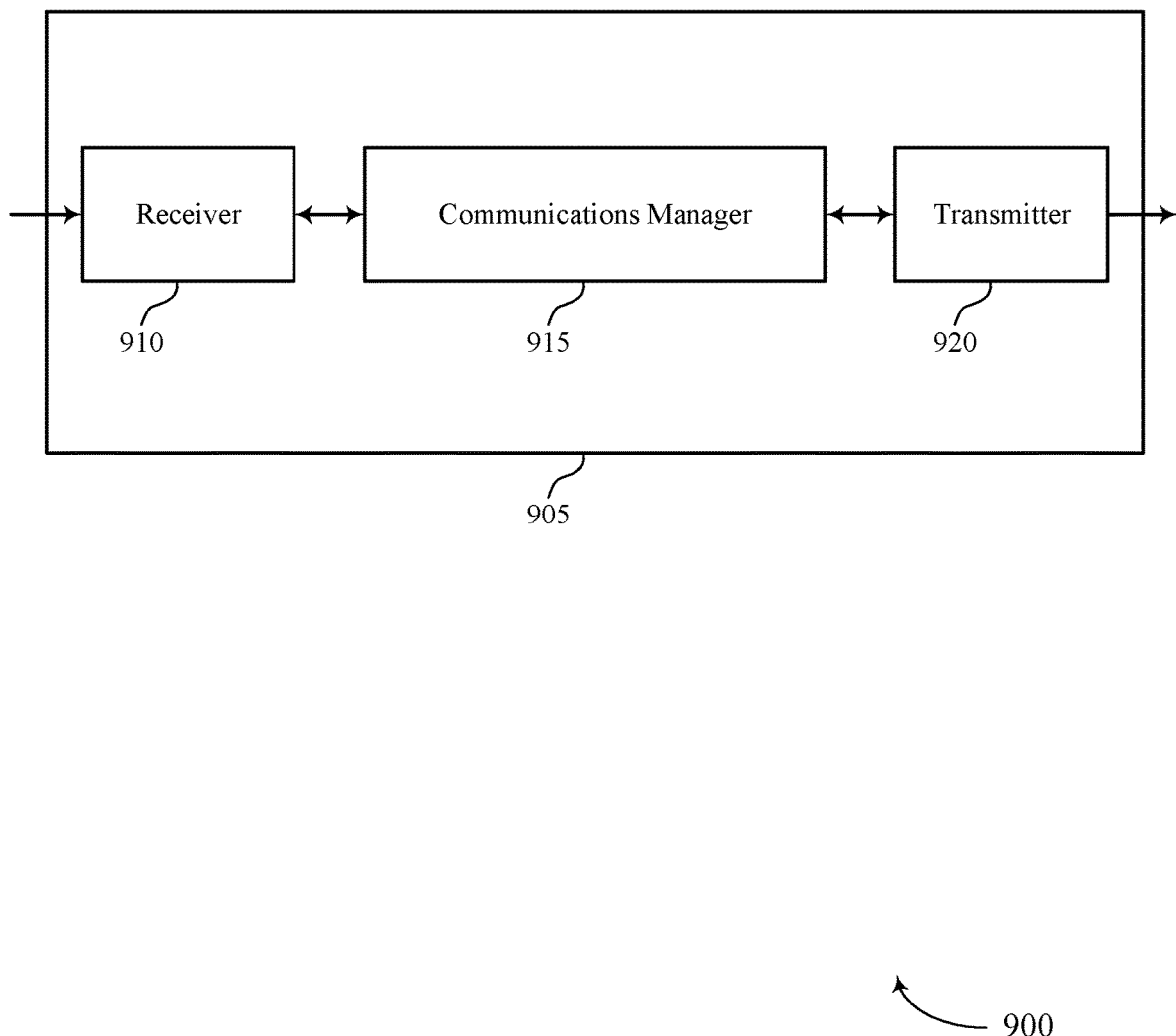
FIGS. 9 and 10 show block diagrams of devices that support SIM ranking and connection routing in accordance with aspects of the present disclosure.

FIG. 9 shows a block diagram 900 of a device 905 that supports SIM ranking and connection routing in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to SIM ranking and connection routing, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive an indication for establishing communications between a first device and a second device based on a first SIM pair, the first SIM pair including a first SIM from a first set of SIMs of the first device and a second SIM of a second set of SIMs of the second device, compare a first set of capabilities associated with the first set of SIMs and a second set of capabilities associated with the second set of SIMs based on the indication for establishing the communications between the first device and the second device, identify a second SIM pair between a first candidate SIM from the first set of SIMs and a second candidate SIM from the second set of SIMs for a connection for establishing the communications between the first device and the second device based on the comparing the first set of capabilities with the second set of capabilities, and establish the connection between the first device and the second device based on the second SIM pair. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
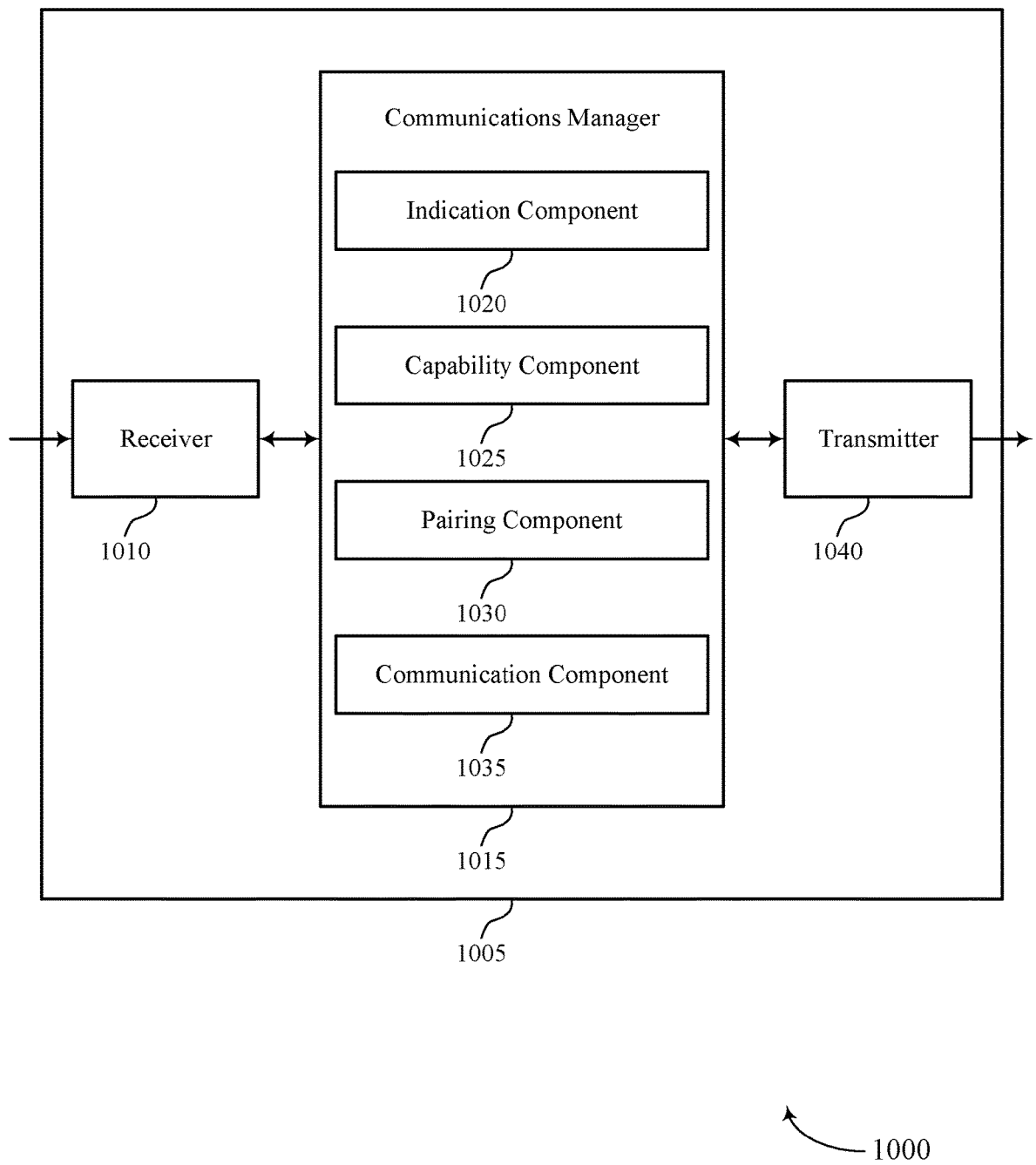

FIG. 10 shows a block diagram 1000 of a device 1005 that supports SIM ranking and connection routing in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to SIM ranking and connection routing, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an indication component 1020, a capability component 1025, a pairing component 1030, and a communication component 1035. The communications manager 1015 may be an example of aspects of the communications manager 1210 described herein.

The indication component 1020 may receive an indication for establishing communications between a first device and a second device based on a first SIM pair, the first SIM pair including a first SIM from a first set of SIMs of the first device and a second SIM of a second set of SIMs of the second device. The capability component 1025 may compare a first set of capabilities associated with the first set of SIMs and a second set of capabilities associated with the second set of SIMs based on the indication for establishing the communications between the first device and the second device.

The pairing component 1030 may identify a second SIM pair between a first candidate SIM from the first set of SIMs and a second candidate SIM from the second set of SIMs for a connection for establishing the communications between the first device and the second device based on the comparing the first set of capabilities with the second set of capabilities. The communication component 1035 may establish the connection between the first device and the second device based on the second SIM pair.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
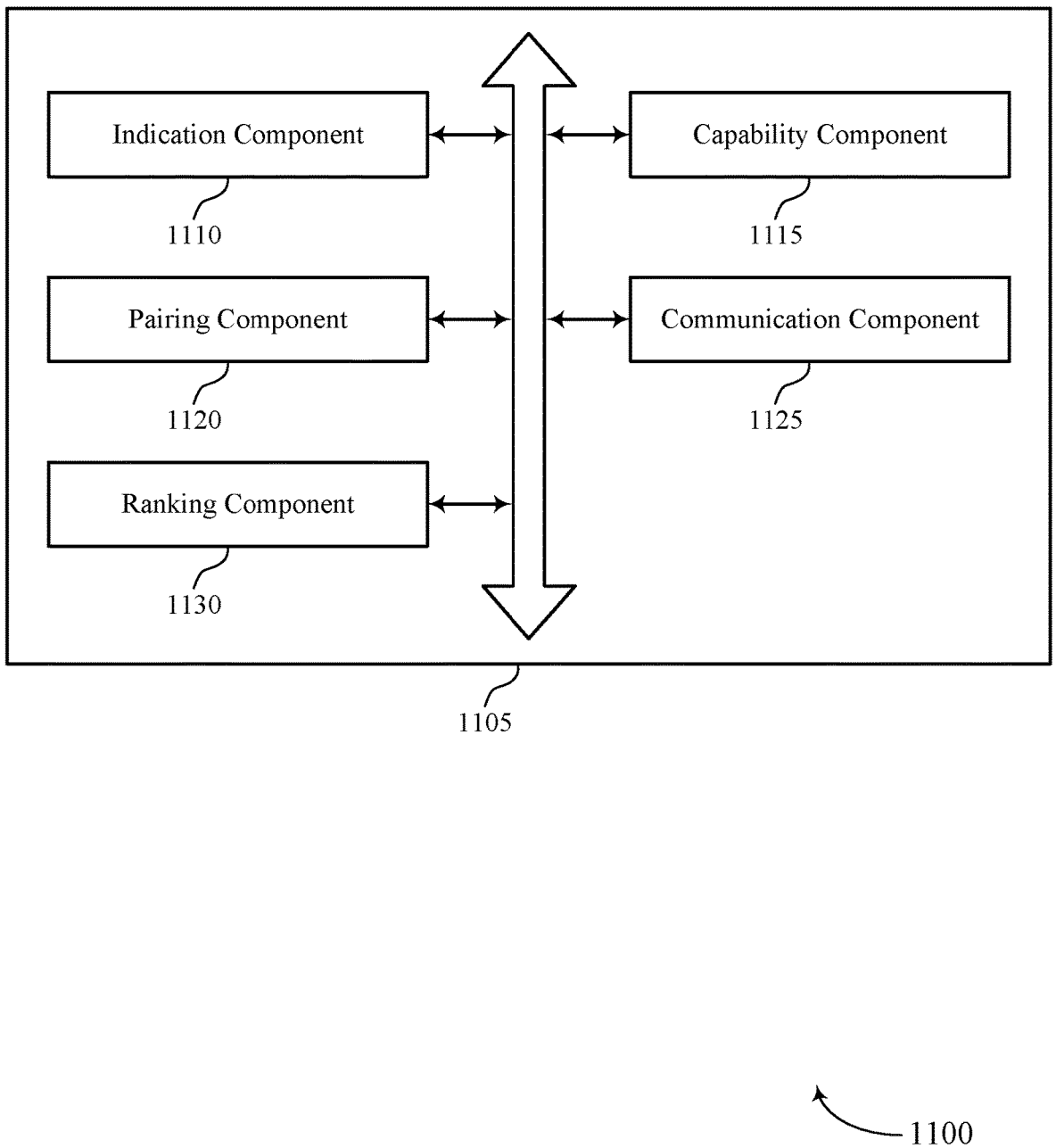
FIG. 11 shows a block diagram of a communications manager that supports SIM ranking and connection routing in accordance with aspects of the present disclosure.

FIG. 11 shows a block diagram 1100 of a communications manager 1105 that supports SIM ranking and connection routing in accordance with aspects of the present disclosure. The communications manager 1105 may be an example of aspects of a communications manager 915, a communications manager 1015, or a communications manager 1210 described herein. The communications manager 1105 may include an indication component 1110, a capability component 1115, a pairing component 1120, a communication component 1125, and a ranking component 1130. Each of these modules may communicate, directly or indirectly, with one another (e.g., via one or more buses).

The indication component 1110 may receive an indication for establishing communications between a first device and a second device based on a first SIM pair, the first SIM pair including a first SIM from a first set of SIMs of the first device and a second SIM of a second set of SIMs of the second device. In some cases, the indication for establishing the communications includes a QoS associated with one or more of an application on the first device or a user profile. In some cases, the indication for establishing the communications includes a RAT associated with an application of the first device.

The capability component 1115 may compare a first set of capabilities associated with the first set of SIMs and a second set of capabilities associated with the second set of SIMs based on the indication for establishing the communications between the first device and the second device. In some examples, the capability component 1115 may compare the first set of capabilities associated with the first set of SIMs and the second set of capabilities associated with the second set of SIMs based on the QoS. In some examples, the capability component 1115 may compare the first set of capabilities associated with the first set of SIMs and the second set of capabilities associated with the second set of SIMs based on the RAT associated with the application.

The pairing component 1120 may identify a second SIM pair between a first candidate SIM from the first set of SIMs and a second candidate SIM from the second set of SIMs for a connection for establishing the communications between the first device and the second device based on the comparing the first set of capabilities with the second set of capabilities. In some examples, identifying the second SIM pair includes identifying the second candidate SIM from the second set of SIMs based on determining the set of rankings associated with the second set of SIMs.

In some cases, the first SIM is associated with a first RAT. In some cases, the second SIM is associated with a second RAT different from the first RAT. In some cases, the first candidate SIM includes the first SIM. In some cases, the second candidate SIM includes a SIM that is different from the second SIM and associated with the first RAT.

In some cases, the first SIM is associated with a first RAT. In some cases, the second SIM is associated with the first RAT, where a first set of network capabilities associated with the second SIM with respect to a first set of coordinates fail to satisfy a threshold, and a second set of network capabilities associated with the second SIM with respect to a second set of coordinates satisfy the threshold. In some cases, the first candidate SIM includes the first SIM. In some cases, the second candidate SIM includes a SIM that is different from the second SIM and associated with the first RAT, where a set of network capabilities associated with the second candidate SIM with respect to the first set of coordinates satisfy the threshold.

In some cases, the first SIM is associated with a first RAT, where a set of network capabilities of the first SIM includes a first set of network capabilities supporting the first RAT and a second set of network capabilities supporting a second RAT different from the first RAT. In some cases, the second SIM is associated with the second RAT. In some cases, the first candidate SIM includes the first SIM, where the first SIM is configured for using the second set of network capabilities supporting the second RAT. In some cases, the second candidate SIM includes the second SIM.

The communication component 1125 may establish the connection between the first device and the second device based on the second SIM pair. The ranking component 1130 may determine a set of rankings associated with the second set of SIMs based on the first set of capabilities associated with the first set of SIMs and the second set of capabilities associated with the second set of SIMs.

In some cases, the second device is located at a first set of coordinates. In some cases, the first SIM is associated with a first RAT. In some cases, the second SIM is associated with the first RAT, where a profile associated with the second SIM includes an indication of establishing one or more previous connections using the first RAT at a second set of coordinates. In some cases, the first candidate SIM includes the first SIM. In some cases, the second candidate SIM includes a SIM that is different from the second SIM and associated with the first RAT, where a profile associated with the second candidate SIM includes an indication of establishing one or more previous connections using the first RAT at the first set of coordinates.

In some examples, the ranking component 1130 may determine the set of rankings associated with the second set of SIMS based on a LUT including at least the set of rankings associated with the second set of SIMS. In some cases, the LUT may include, for each SIM of the first set of SIMs and the second set of SIMs, one or more of: an identifier of the SIM, a set of RATs supported by the SIM, a QoS associated with the SIM with respect to each application of a set of applications. a set of whitelisted applications of the set of applications, the set of whitelisted applications being associated with a set of user preferences, a user selection, or both, a set of network capabilities associated with the SIM with respect to one or more sets of coordinates, a profile associated with establishing one or more previous connections using the SIM with respect to the one or more sets of coordinates, or a current set of coordinates of a device including the SIM.

Figure 12:
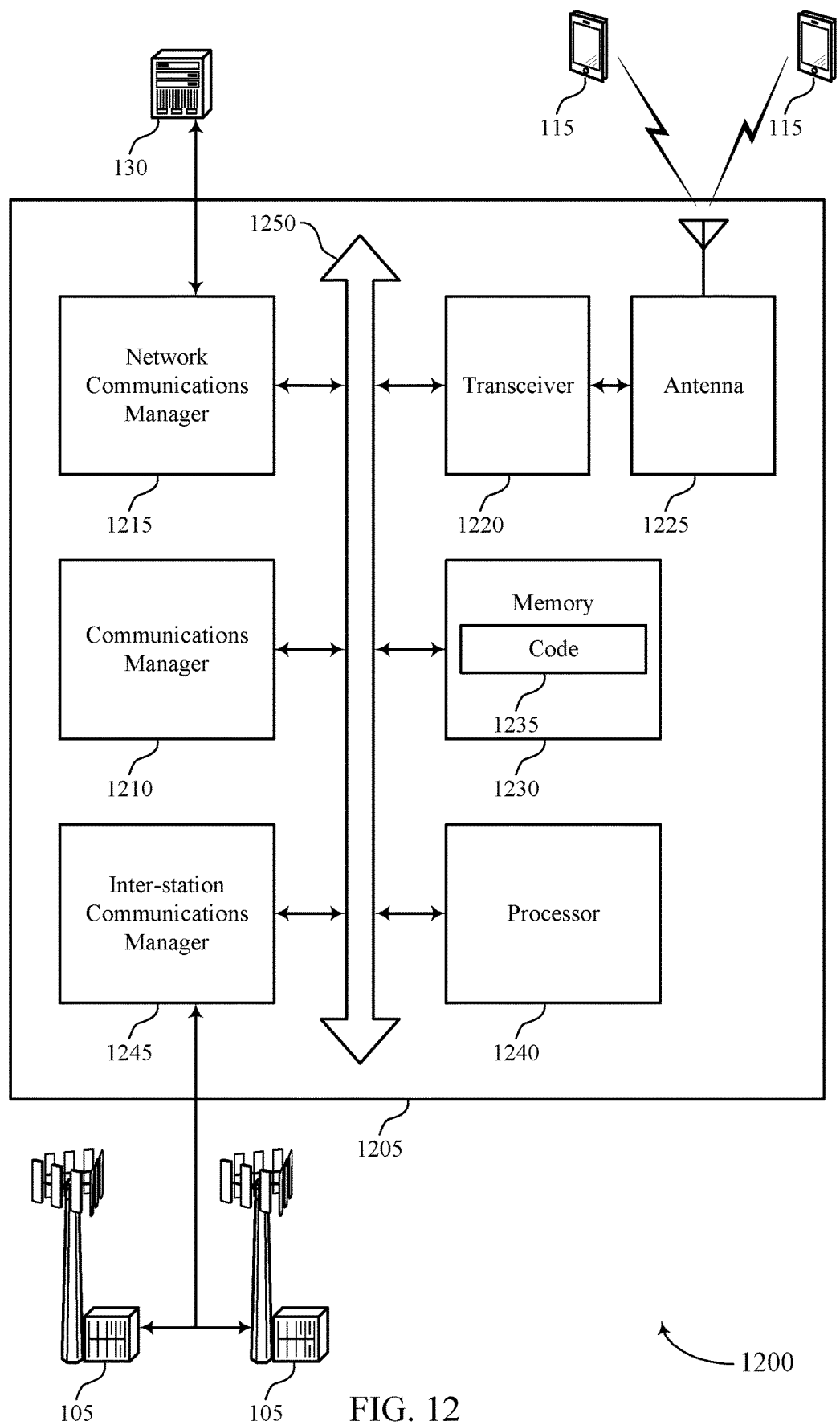
FIG. 12 shows a diagram of a system including a device that supports SIM ranking and connection routing in accordance with aspects of the present disclosure.

FIG. 12 shows a diagram of a system 1200 including a device 1205 that supports SIM ranking and connection routing in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive an indication for establishing communications between a first device and a second device based on a first SIM pair, the first SIM pair including a first SIM from a first set of SIMs of the first device and a second SIM of a second set of SIMs of the second device, compare a first set of capabilities associated with the first set of SIMs and a second set of capabilities associated with the second set of SIMs based on the indication for establishing the communications between the first device and the second device, identify a second SIM pair between a first candidate SIM from the first set of SIMs and a second candidate SIM from the second set of SIMs for a connection for establishing the communications between the first device and the second device based on the comparing the first set of capabilities with the second set of capabilities, and establish the connection between the first device and the second device based on the second SIM pair.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting SIM ranking and connection routing).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
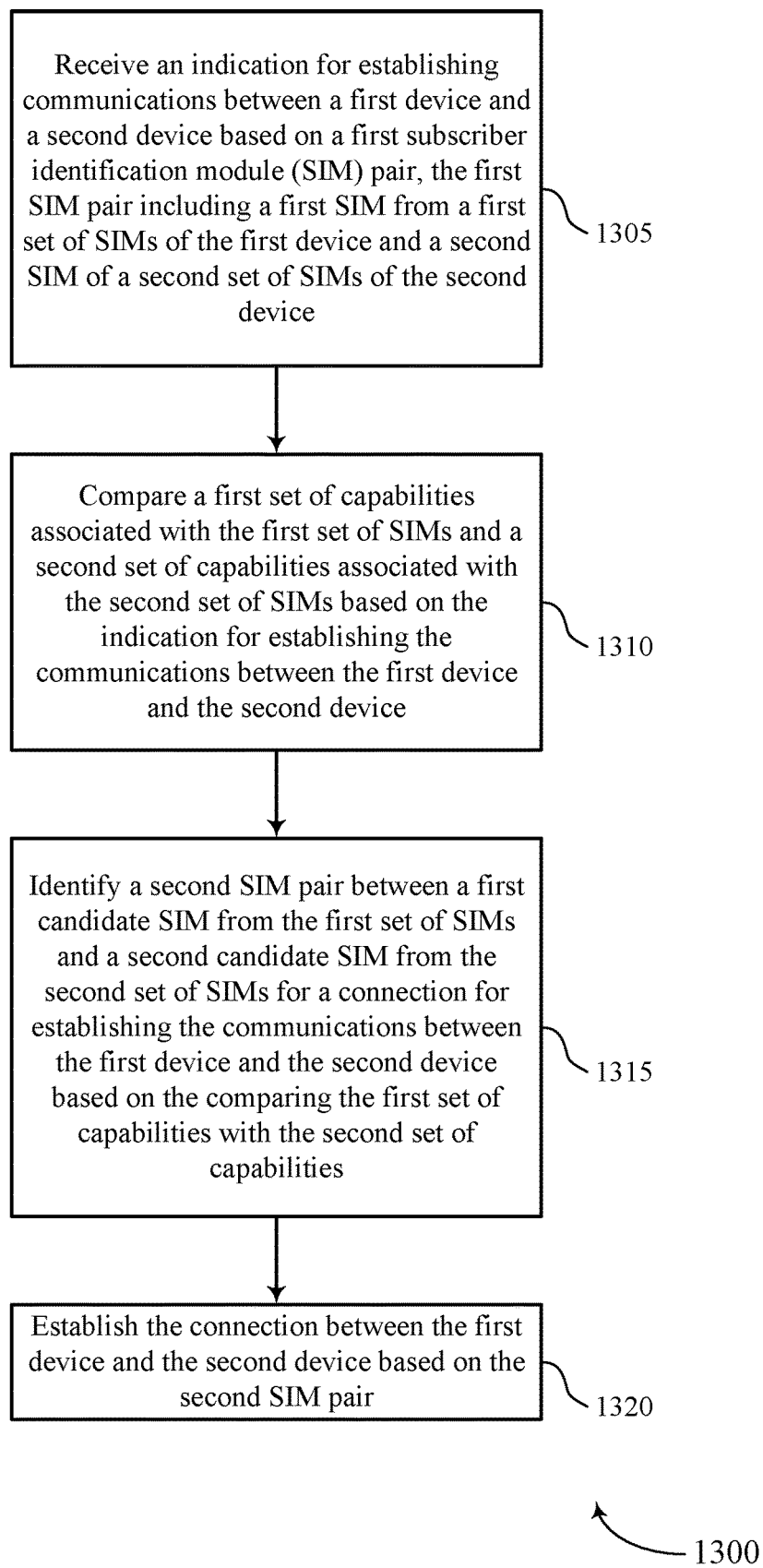
FIGS. 13 through 16 show flowcharts illustrating methods that support SIM ranking and connection routing in accordance with aspects of the present disclosure.

FIG. 13 shows a flowchart illustrating a method 1300 that supports SIM ranking and connection routing in accordance with aspects of the present disclosure. The operations of method 1300 may be implemented by a base station 105 or its components as described herein. For example, the operations of method 1300 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1305, the base station may receive an indication for establishing communications between a first device and a second device based on a first SIM pair, the first SIM pair including a first SIM from a first set of SIMs of the first device and a second SIM of a second set of SIMs of the second device. The operations of 1305 may be performed according to the methods described herein. In some examples, aspects of the operations of 1305 may be performed by an indication component as described with reference to FIGS. 9 through 12.

At 1310, the base station may compare a first set of capabilities associated with the first set of SIMs and a second set of capabilities associated with the second set of SIMs based on the indication for establishing the communications between the first device and the second device. The operations of 1310 may be performed according to the methods described herein. In some examples, aspects of the operations of 1310 may be performed by a capability component as described with reference to FIGS. 9 through 12.

At 1315, the base station may identify a second SIM pair between a first candidate SIM from the first set of SIMs and a second candidate SIM from the second set of SIMs for a connection for establishing the communications between the first device and the second device based on the comparing the first set of capabilities with the second set of capabilities. The operations of 1315 may be performed according to the methods described herein. In some examples, aspects of the operations of 1315 may be performed by a pairing component as described with reference to FIGS. 9 through 12.

At 1320, the base station may establish the connection between the first device and the second device based on the second SIM pair. The operations of 1320 may be performed according to the methods described herein. In some examples, aspects of the operations of 1320 may be performed by a communication component as described with reference to FIGS. 9 through 12.

Figure 14:
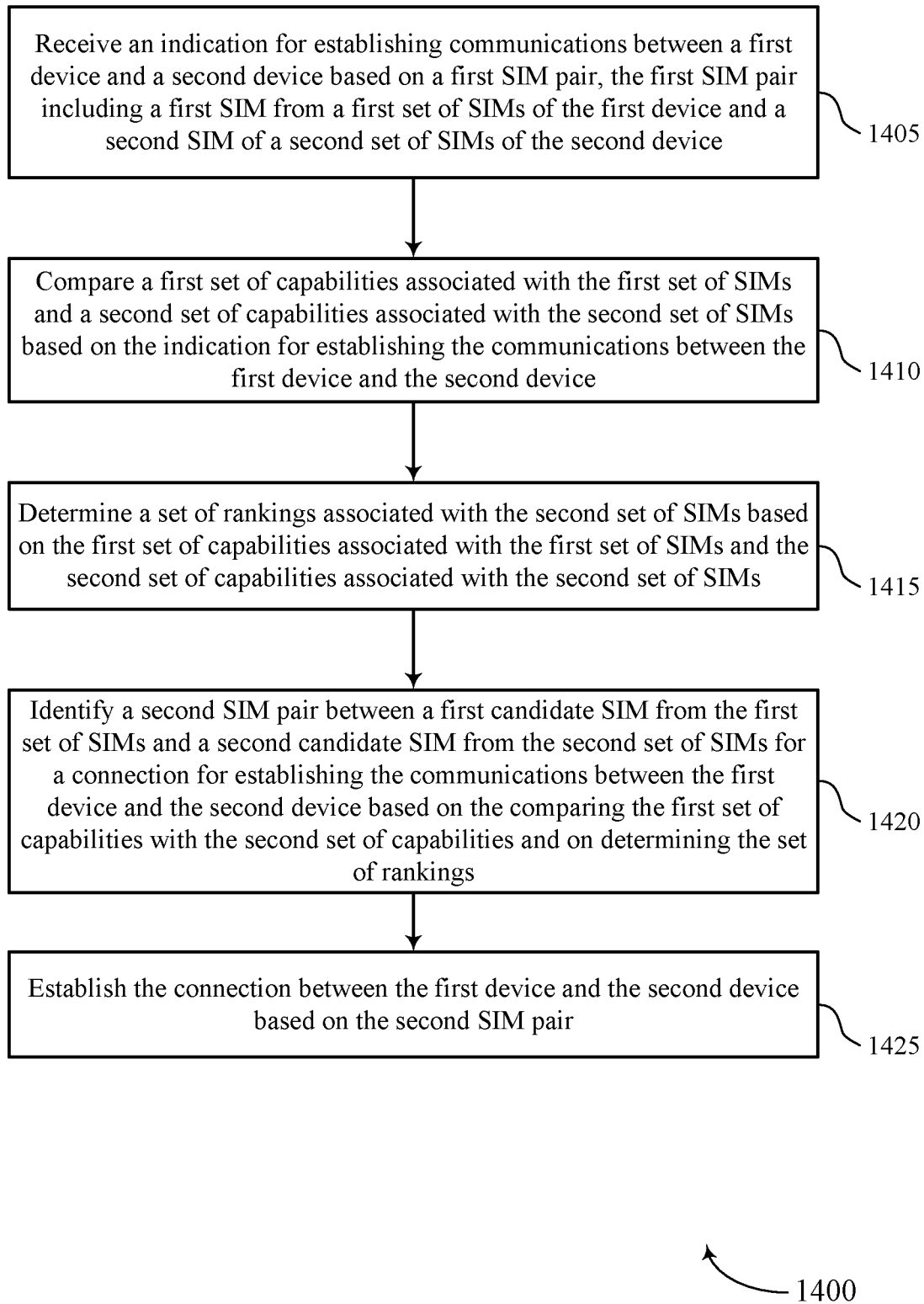

FIG. 14 shows a flowchart illustrating a method 1400 that supports SIM ranking and connection routing in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may receive an indication for establishing communications between a first device and a second device based on a first SIM pair, the first SIM pair including a first SIM from a first set of SIMs of the first device and a second SIM of a second set of SIMs of the second device. The operations of 1405 may be performed according to the methods described herein. In some examples, aspects of the operations of 1405 may be performed by an indication component as described with reference to FIGS. 9 through 12.

At 1410, the base station may compare a first set of capabilities associated with the first set of SIMs and a second set of capabilities associated with the second set of SIMs based on the indication for establishing the communications between the first device and the second device. The operations of 1410 may be performed according to the methods described herein. In some examples, aspects of the operations of 1410 may be performed by a capability component as described with reference to FIGS. 9 through 12.

At 1415, the base station may determine a set of rankings associated with the second set of SIMs based on the first set of capabilities associated with the first set of SIMs and the second set of capabilities associated with the second set of SIMs. The operations of 1415 may be performed according to the methods described herein. In some examples, aspects of the operations of 1415 may be performed by a ranking component as described with reference to FIGS. 9 through 12.

At 1420, the base station may identify a second SIM pair between a first candidate SIM from the first set of SIMs and a second candidate SIM from the second set of SIMs for a connection for establishing the communications between the first device and the second device based on the comparing the first set of capabilities with the second set of capabilities. In some cases, the base station may identify the second candidate SIM from the second set of SIMs based on determining the set of rankings associated with the second set of SIMs.

The operations of 1420 may be performed according to the methods described herein. In some examples, aspects of the operations of 1420 may be performed by a pairing component as described with reference to FIGS. 9 through 12.

At 1425, the base station may establish the connection between the first device and the second device based on the second SIM pair. The operations of 1425 may be performed according to the methods described herein. In some examples, aspects of the operations of 1425 may be performed by a communication component as described with reference to FIGS. 9 through 12.

Figure 15:
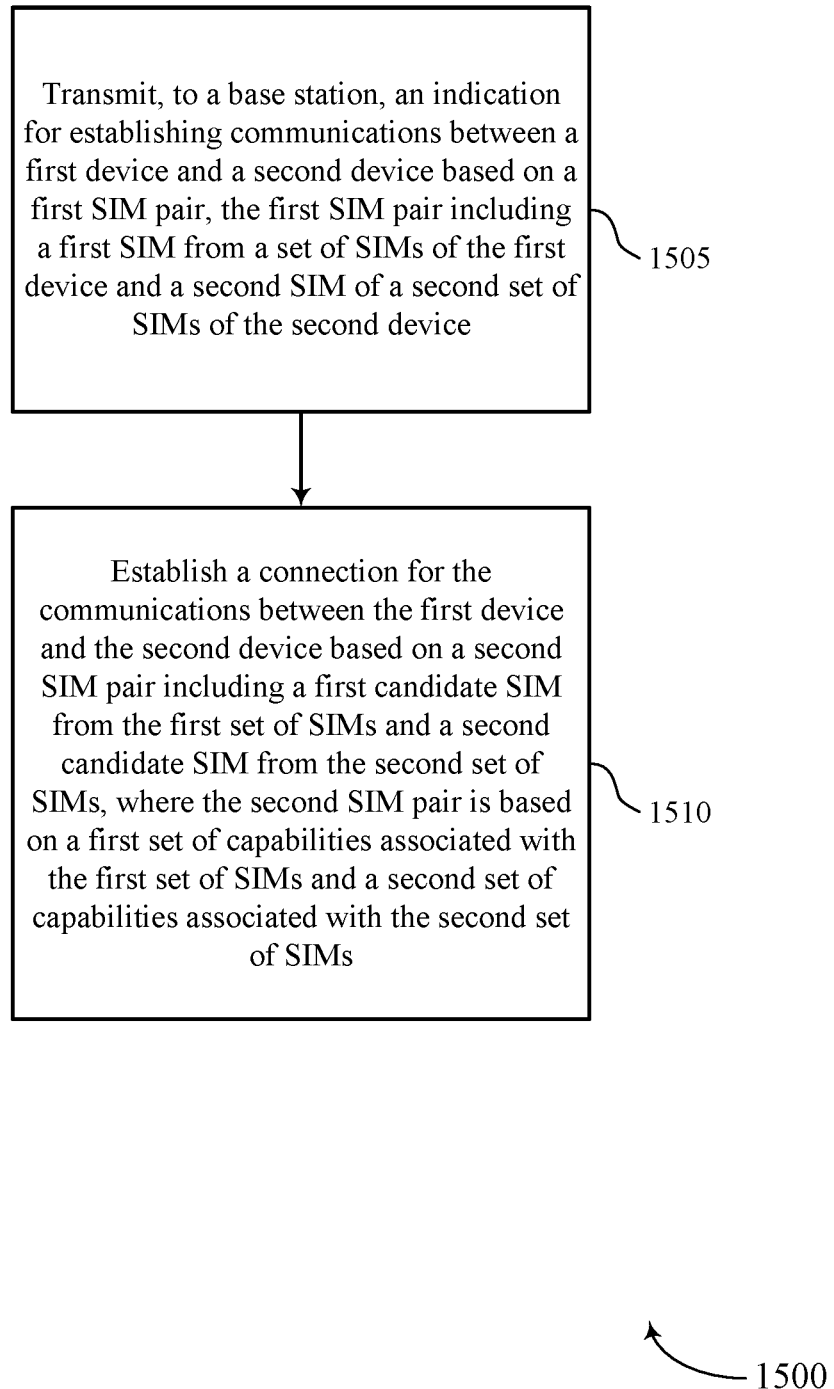

FIG. 15 shows a flowchart illustrating a method 1500 that supports SIM ranking and connection routing in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station, an indication for establishing communications between a first device and a second device based on a first SIM pair, the first SIM pair including a first SIM from a set of SIMs of the first device and a second SIM of a second set of SIMs of the second device. The operations of 1505 may be performed according to the methods described herein. In some examples, aspects of the operations of 1505 may be performed by an indication component as described with reference to FIGS. 5 through 8.

At 1510, the UE may establish a connection for the communications between the first device and the second device based on a second SIM pair including a first candidate SIM from the first set of SIMs and a second candidate SIM from the second set of SIMs, where the second SIM pair is based on a first set of capabilities associated with the first set of SIMs and a second set of capabilities associated with the second set of SIMs. The operations of 1510 may be performed according to the methods described herein. In some examples, aspects of the operations of 1510 may be performed by a communication component as described with reference to FIGS. 5 through 8.

Figure 16:
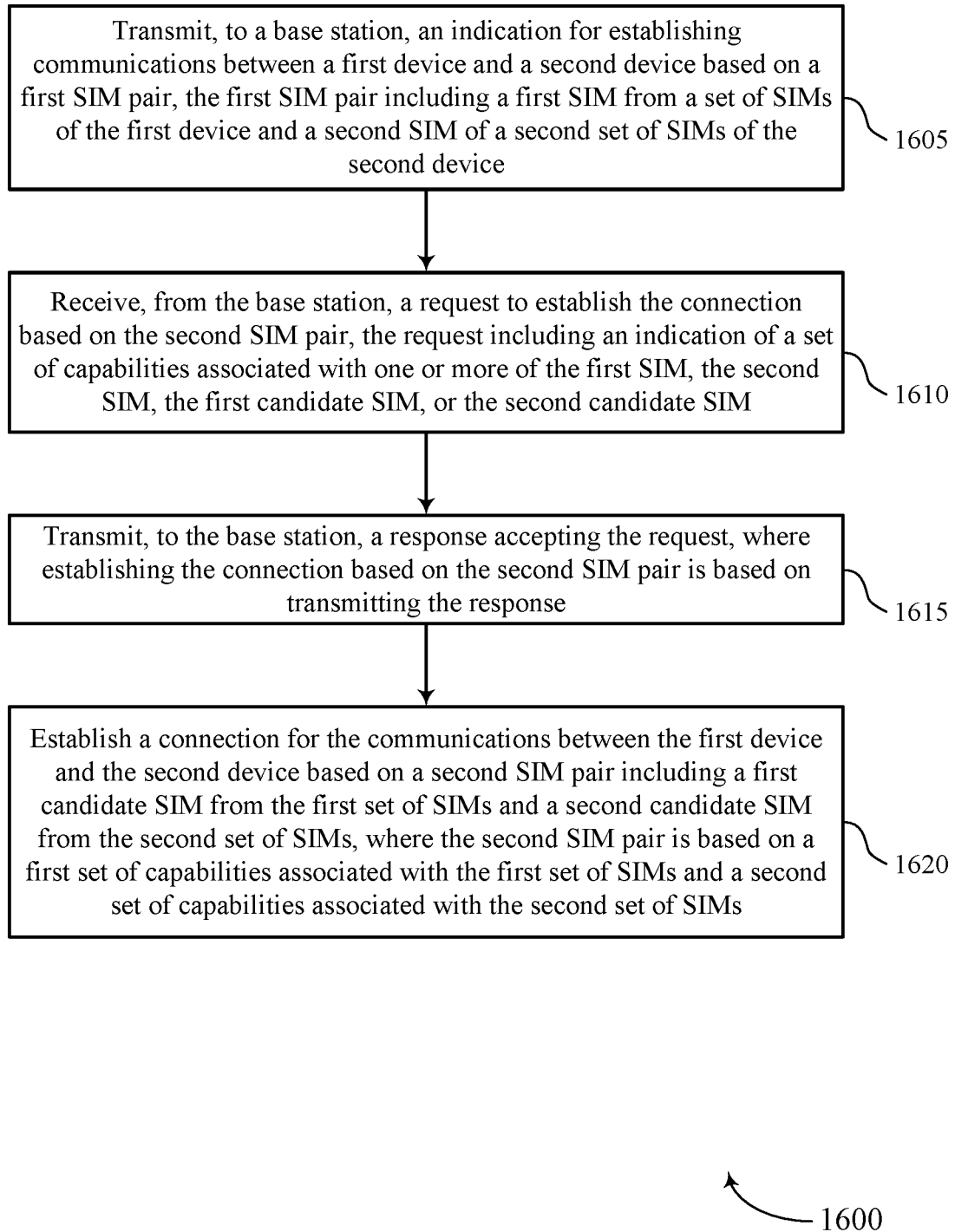

FIG. 16 shows a flowchart illustrating a method 1600 that supports SIM ranking and connection routing in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may transmit, to a base station, an indication for establishing communications between a first device and a second device based on a first SIM pair, the first SIM pair including a first SIM from a set of SIMs of the first device and a second SIM of a second set of SIMs of the second device. The operations of 1605 may be performed according to the methods described herein. In some examples, aspects of the operations of 1605 may be performed by an indication component as described with reference to FIGS. 5 through 8.

At 1610, the UE may receive, from the base station, a request to establish the connection based on the second SIM pair, the request including an indication of a set of capabilities associated with one or more of the first SIM, the second SIM, the first candidate SIM, or the second candidate SIM. The operations of 1610 may be performed according to the methods described herein. In some examples, aspects of the operations of 1610 may be performed by a communication component as described with reference to FIGS. 5 through 8.

At 1615, the UE may transmit, to the base station, a response accepting the request, where establishing the connection based on the second SIM pair is based on transmitting the response. The operations of 1615 may be performed according to the methods described herein. In some examples, aspects of the operations of 1615 may be performed by a communication component as described with reference to FIGS. 5 through 8.

At 1620, the UE may establish a connection for the communications between the first device and the second device based on a second SIM pair including a first candidate SIM from the first set of SIMs and a second candidate SIM from the second set of SIMs, where the second SIM pair is based on a first set of capabilities associated with the first set of SIMs and a second set of capabilities associated with the second set of SIMs. The operations of 1620 may be performed according to the methods described herein. In some examples, aspects of the operations of 1620 may be performed by a communication component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving an indication for establishing communications between a first device and a second device based at least in part on a first subscriber identification module (SIM) pair, the first SIM pair comprising a first SIM from a first set of SIMs of the first device and a second SIM of a second set of SIMs of the second device;
    comparing a first set of capabilities associated with the first set of SIMs and a second set of capabilities associated with the second set of SIMs based at least in part on the indication for establishing the communications between the first device and the second device;
    identifying a second SIM pair between a first candidate SIM from the first set of SIMs and a second candidate SIM from the second set of SIMs for a connection for establishing the communications between the first device and the second device based at least in part on the comparing the first set of capabilities with the second set of capabilities; and
establishing the connection between the first device and the second device based at least in part on the second SIM pair.

2. The method of claim 1, further comprising:
determining a set of rankings associated with the second set of SIMs based at least in part on the first set of capabilities associated with the first set of SIMs and the second set of capabilities associated with the second set of SIMs,
wherein identifying the second SIM pair comprises identifying the second candidate SIM from the second set of SIMs based at least in part on determining the set of rankings associated with the second set of SIMs.

3. The method of claim 2, wherein:
determining the set of rankings associated with the second set of SIMS is based at least in part on a lookup table (LUT) comprising at least the set of rankings associated with the second set of SIMS.

4. The method of claim 3, wherein the LUT comprises, for each SIM of the first set of SIMs and the second set of SIMs, one or more of:
an identifier of the SIM;
a set of radio access technologies (RATs) supported by the SIM;
a quality of service (QoS) associated with the SIM with respect to each application of a set of applications;
a set of whitelisted applications of the set of applications, the set of whitelisted applications being associated with a set of user preferences, a user selection, or both;
a set of network capabilities associated with the SIM with respect to one or more sets of coordinates;
a profile associated with establishing one or more previous connections using the SIM with respect to the one or more sets of coordinates;
a current set of coordinates of a device comprising the SIM; and
a history of associated with a user profile.

5. The method of claim 1, wherein:
the indication for establishing the communications comprises a quality of service (QoS) associated with one or more of an application on the first device or a user profile,
wherein comparing the first set of capabilities associated with the first set of SIMs and the second set of capabilities associated with the second set of SIMs is based at least in part on the QoS.

6. The method of claim 1, wherein:
the indication for establishing the communications comprises a radio access technology (RAT) associated with an application of the first device,
wherein comparing the first set of capabilities associated with the first set of SIMs and the second set of capabilities associated with the second set of SIMs is based at least in part on the RAT associated with the application.

7. The method of claim 1, wherein:
the first SIM is associated with a first radio access technology (RAT);
the second SIM is associated with a second RAT different from the first RAT;
the first candidate SIM comprises the first SIM; and
the second candidate SIM comprises a SIM that is different from the second SIM and associated with the first RAT.

8. The method of claim 1, wherein:
the first SIM is associated with a first radio access technology (RAT);
the second SIM is associated with the first RAT, wherein a first set of network capabilities associated with the second SIM with respect to a first set of coordinates fail to satisfy a threshold, and a second set of network capabilities associated with the second SIM with respect to a second set of coordinates satisfy the threshold;
the first candidate SIM comprises the first SIM; and
the second candidate SIM comprises a SIM that is different from the second SIM and associated with the first RAT, wherein a set of network capabilities associated with the second candidate SIM with respect to the first set of coordinates satisfy the threshold.

9. The method of claim 1, wherein:
the first SIM is associated with a first radio access technology (RAT), wherein a set of network capabilities of the first SIM comprises a first set of network capabilities supporting the first RAT and a second set of network capabilities supporting a second RAT different from the first RAT;
the second SIM is associated with the second RAT;
the first candidate SIM comprises the first SIM, wherein the first SIM is configured for using the second set of network capabilities supporting the second RAT; and
the second candidate SIM comprises the second SIM.

10. The method of claim 1, wherein:
the second device is located at a first set of coordinates;
the first SIM is associated with a first radio access technology (RAT);
the second SIM is associated with the first RAT, wherein a profile associated with the second SIM comprises an indication of establishing one or more previous connections using the first RAT at a second set of coordinates;
the first candidate SIM comprises the first SIM; and
the second candidate SIM comprises a SIM that is different from the second SIM and associated with the first RAT, wherein a profile associated with the second candidate SIM comprises an indication of establishing one or more previous connections using the first RAT at the first set of coordinates.

11. The method of claim 1, wherein the second SIM pair comprises one or more of the first SIM or the second SIM of the first SIM pair.

12. A method for wireless communication at a first device, comprising:
transmitting, to a base station, an indication for establishing communications between a first device and a second device based at least in part on a first subscriber identification module (SIM) pair, the first SIM pair comprising a first SIM from a set of SIMs of the first device and a second SIM of a second set of SIMs of the second device; and
establishing a connection for the communications between the first device and the second device based at least in part on a second SIM pair comprising a first candidate SIM from the first set of SIMs and a second candidate SIM from the second set of SIMs, wherein the second SIM pair is based at least in part on a first set of capabilities associated with the first set of SIMs and a second set of capabilities associated with the second set of SIMs.

13. The method of claim 12, further comprising:
receiving, from the base station, a request to establish the connection based at least in part on the second SIM pair, the request comprising an indication of a set of capabilities associated with one or more of the first SIM, the second SIM, the first candidate SIM, or the second candidate SIM; and transmitting, to the base station, a response accepting the request, wherein establishing the connection based at least in part on the second SIM pair is based at least in part on transmitting the response.

14. The method of claim 12, wherein:
the first SIM is associated with a first radio access technology (RAT);
the second SIM is associated with a second RAT different from the first RAT;
the first candidate SIM comprises the first SIM; and
the second candidate SIM comprises a SIM that is different from the second SIM and associated with the first RAT.

15. The method of claim 12, wherein:
the first SIM is associated with a first radio access technology (RAT);
the second SIM is associated with the first RAT, wherein a first set of network capabilities associated with the second SIM with respect to a first set of coordinates fail to satisfy a threshold, and a second set of network capabilities associated with the second SIM with respect to a second set of coordinates satisfy the threshold;
the first candidate SIM comprises the first SIM; and
the second candidate SIM comprises a SIM that is different from the second SIM and associated with the first RAT, wherein a set of network capabilities associated with the second candidate SIM with respect to the first set of coordinates satisfy the threshold.

16. The method of claim 12, wherein:
the first SIM is associated with a first radio access technology (RAT), wherein a set of network capabilities of the first SIM comprises a first set of network capabilities supporting the first RAT and a second set of network capabilities supporting a second RAT different from the first RAT;
the second SIM is associated with the second RAT;
the first candidate SIM comprises the first SIM, wherein the first SIM is configured for using the second set of network capabilities supporting the second RAT; and
the second candidate SIM comprises the second SIM.

17. The method of claim 12, wherein:
the second device is located at a first set of coordinates;
the first SIM is associated with a first radio access technology (RAT);
the second SIM is associated with the first RAT, wherein a profile associated with the second SIM comprises an indication of establishing one or more previous connections using the first RAT at a second set of coordinates;
the first candidate SIM comprises the first SIM; and
the second candidate SIM comprises a SIM that is different from the second SIM and associated with the first RAT, wherein a profile associated with the second candidate SIM comprises an indication of establishing one or more previous connections using the first RAT at the first set of coordinates.

18. An apparatus for wireless communication, comprising:
a processor,
memory coupled with the processor; and
instructions stored in the memory and executable by the processor to cause the apparatus to:

receive an indication for establishing communications between a first device and a second device based at least in part on a first subscriber identification module (SIM) pair, the first SIM pair comprising a first SIM from a first set of SIMs of the first device and a second SIM of a second set of SIMs of the second device;

compare a first set of capabilities associated with the first set of SIMs and a second set of capabilities associated with the second set of SIMs based at least in part on the indication for establishing the communications between the first device and the second device;

identify a second SIM pair between a first candidate SIM from the first set of SIMs and a second candidate SIM from the second set of SIMs for a connection for establishing the communications between the first device and the second device based at least in part on the comparing the first set of capabilities with the second set of capabilities; and establish the connection between the first device and the second device based at least in part on the second SIM pair.

19. The apparatus of claim 18, wherein the instructions are further executable by the processor to cause the apparatus to:

determine a set of rankings associated with the second set of SIMs based at least in part on the first set of capabilities associated with the first set of SIMs and the second set of capabilities associated with the second set of SIMs, wherein identifying the second SIM pair comprises identifying the second candidate SIM from the second set of SIMs based at least in part on determining the set of rankings associated with the second set of SIMs.

20. The apparatus of claim 19, wherein determining the set of rankings associated with the second set of SIMS is based at least in part on a lookup table (LUT) comprising at least the set of rankings associated with the second set of SIMS.

21. The apparatus of claim 20, wherein the LUT comprises, for each SIM of the first set of SIMs and the second set of SIMs, one or more of: comprises:
an identifier of the SIM;
a set of radio access technologies (RATs) supported by the SIM;
a quality of service (QoS) associated with the SIM with respect to each application of a set of applications;
a set of whitelisted applications of the set of applications, the set of whitelisted applications being associated with a set of user preferences, a user selection, or both;
a set of network capabilities associated with the SIM with respect to one or more sets of coordinates;
a profile associated with establishing one or more previous connections using the SIM with respect to the one or more sets of coordinates; and
a current set of coordinates of a device comprising the SIM.

22. The apparatus of claim 18, wherein:
the indication for establishing the communications comprises a quality of service (QoS) associated with one or more of an application on the first device or a user profile,
wherein comparing the first set of capabilities associated with the first set of SIMs and the second set of capabilities associated with the second set of SIMs is based at least in part on the QoS.

23. The apparatus of claim 18, wherein:
the indication for establishing the communications comprises a radio access technology (RAT) associated with an application of the first device,
wherein comparing the first set of capabilities associated with the first set of SIMs and the second set of capabilities associated with the second set of SIMs is based at least in part on the RAT associated with the application.

24. The apparatus of claim 18, wherein:
the first SIM is associated with a first radio access technology (RAT);
the second SIM is associated with a second RAT different from the first RAT;
the first candidate SIM comprises the first SIM; and
the second candidate SIM comprises a SIM that is different from the second SIM and associated with the first RAT.

25. The apparatus of claim 18, wherein:
the first SIM is associated with a first radio access technology (RAT);
the second SIM is associated with the first RAT, wherein a first set of network capabilities associated with the second SIM with respect to a first set of coordinates fail to satisfy a threshold, and a second set of network capabilities associated with the second SIM with respect to a second set of coordinates satisfy the threshold;
the first candidate SIM comprises the first SIM; and
the second candidate SIM comprises a SIM that is different from the second SIM and associated with the first RAT, wherein a set of network capabilities associated with the second candidate SIM with respect to the first set of coordinates satisfy the threshold.

26. The apparatus of claim 18, wherein:
the first SIM is associated with a first radio access technology (RAT), wherein a set of network capabilities of the first SIM comprises a first set of network capabilities supporting the first RAT and a second set of network capabilities supporting a second RAT different from the first RAT;
the second SIM is associated with the second RAT;
the first candidate SIM comprises the first SIM, wherein the first SIM is configured for using the second set of network capabilities supporting the second RAT; and
the second candidate SIM comprises the second SIM.

27. The apparatus of claim 18, wherein:
the second device is located at a first set of coordinates;
the first SIM is associated with a first radio access technology (RAT);
the second SIM is associated with the first RAT, wherein a profile associated with the second SIM comprises an indication of establishing one or more previous connections using the first RAT at a second set of coordinates;
the first candidate SIM comprises the first SIM; and
the second candidate SIM comprises a SIM that is different from the second SIM and associated with the first RAT, wherein a profile associated with the second candidate SIM comprises an indication of establishing one or more previous connections using the first RAT at the first set of coordinates.

28. The apparatus of claim 18, wherein the second SIM pair comprises one or more of the first SIM or the second SIM of the first SIM pair.

29. An apparatus for wireless communication at a first device, comprising:
a processor,
memory coupled with the processor; and
instructions stored in the memory and executable by the processor to cause the apparatus to:
transmit, to a base station, an indication for establishing communications between a first device and a second device based at least in part on a first subscriber identification module (SIM) pair, the first SIM pair comprising a first SIM from a set of SIMs of the first device and a second SIM of a second set of SIMs of the second device; and
establish a connection for the communications between the first device and the second device based at least in part on a second SIM pair comprising a first candidate SIM from the first set of SIMs and a second candidate SIM from the second set of SIMs, wherein the second SIM pair is based at least in part on a first set of capabilities associated with the first set of SIMs and a second set of capabilities associated with the second set of SIMs.

30. The apparatus of claim 29, wherein the instructions are further executable by the processor to cause the apparatus to:
receive, from the base station, a request to establish the connection based at least in part on the second SIM pair, the request comprising an indication of a set of capabilities associated with one or more of the first SIM, the second SIM, the first candidate SIM, or the second candidate SIM; and
transmit, to the base station, a response accepting the request, wherein establishing the connection based at least in part on the second SIM pair is based at least in part on transmitting the response.

* * * * *